United States Patent
Blumrich et al.

(10) Patent No.: US 7,603,523 B2
(45) Date of Patent: *Oct. 13, 2009

(54) METHOD AND APPARATUS FOR FILTERING SNOOP REQUESTS IN A POINT-TO-POINT INTERCONNECT ARCHITECTURE

(75) Inventors: Matthias A. Blumrich, Ridgefield, CT (US); Dong Chen, Croton On Hudson, NY (US); Alan G. Gara, Mount Kisco, NY (US); Mark E. Giampapa, Irvington, NY (US); Philip Heidelberger, Cortlandt Manor, NY (US); Dirk I. Hoenicke, Ossining, NY (US); Martin Ohmacht, Yorktown Heights, NY (US); Valentina Salapura, Chappaqua, NY (US); Pavlos M. Vranas, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/035,085

(22) Filed: Feb. 21, 2008

(65) Prior Publication Data
US 2008/0133845 A1 Jun. 5, 2008

Related U.S. Application Data

(63) Continuation of application No. 11/093,131, filed on Mar. 29, 2005, now Pat. No. 7,386,683.

(51) Int. Cl.
*G06F 12/08* (2006.01)
*G06F 13/00* (2006.01)

(52) U.S. Cl. .................. 711/146; 711/100; 711/118; 711/131; 711/154

(58) Field of Classification Search .................. 711/100, 711/118, 131, 144, 146, 154
See application file for complete search history.

(56) References Cited

U.S. PATENT DOCUMENTS 5,226,146 A * 7/1993 Milia et al. .................. 711/141

(Continued)

OTHER PUBLICATIONS

Moshovos, et al., "JETTY: Filtering Snoops for Reduced Energy Consumption in SMP Servers", The Proceedings of the 7th International Symposium on High-Performance Computer Architecture; 2001; pp. 1-12.

*Primary Examiner*—Tuan V. Thai
(74) *Attorney, Agent, or Firm*—Scully, Scott, Murphy & Presser, P.C.; Daniel P. Morris, Esq.

(57) ABSTRACT

A method and apparatus for supporting cache coherency in a multiprocessor computing environment having multiple processing units, each processing unit having one or more local cache memories associated and operatively connected therewith. The method comprises providing a snoop filter device associated with each processing unit, each snoop filter device having a plurality of dedicated input ports for receiving snoop requests from dedicated memory writing sources in the multiprocessor computing environment. Each of the memory writing sources is directly connected to the dedicated input ports of all other snoop filter devices associated with all other processing units in a point-to-point interconnect fashion. Each snoop filter device includes a plurality of parallel operating port snoop filters in correspondence with the plurality of dedicated input ports that are adapted to concurrently filter snoop requests received from respective dedicated memory writing sources and forward a subset of those requests to its associated processing unit.

9 Claims, 21 Drawing Sheets

U.S. PATENT DOCUMENTS

| | | |
|---|---|---|
| 5,410,723 A | 4/1995 | Schmidt et al. |
| 5,572,701 A | 11/1996 | Ishida et al. |
| 5,615,343 A | 3/1997 | Sarangdhar |
| 5,655,100 A * | 8/1997 | Ebrahim et al. ............. 711/144 |
| 5,659,710 A | 8/1997 | Sherman et al. |
| 5,835,948 A * | 11/1998 | Olarig et al. ................ 711/128 |
| 5,897,656 A * | 4/1999 | Vogt et al. .................. 711/141 |
| 5,905,998 A | 5/1999 | Ebrahim et al. |
| 5,966,729 A | 10/1999 | Phelps |
| 6,389,517 B1 | 5/2002 | Moudgal et al. |
| 6,704,845 B2 | 3/2004 | Anderson et al. |
| 6,823,409 B2 | 11/2004 | Jones et al. |
| 7,117,312 B1 | 10/2006 | Cypher |
| 2003/0065843 A1 | 4/2003 | Jones et al. |
| 2003/0070016 A1 | 4/2003 | Jones et al. |
| 2003/0126376 A1 | 7/2003 | Blankenship et al. |
| 2003/0131201 A1 | 7/2003 | Khare et al. |
| 2003/0135696 A1 | 7/2003 | Rankin et al. |
| 2004/0003184 A1 | 1/2004 | Safranek et al. |
| 2006/0095684 A1 | 5/2006 | Shen |

* cited by examiner

METHOD AND APPARATUS FOR FILTERING SNOOP REQUESTS IN A POINT-TO-POINT INTERCONNECT ARCHITECTURE

CROSS-REFERENCE TO RELATED APPLICATIONS

This application is a continuation of U.S. application Ser. No. 11/093,131, filed Mar. 29, 2005. This application relates to commonly-owned, co-pending U.S. patent application Ser. Nos. 11/093,130; 11/093,154; 11/093,152; 11/093,132; 11/093,127; 11/093,160 all filed on Mar. 29, 2005 and incorporated by reference as if fully set forth herein.

BACKGROUND OF THE INVENTION

1. Field of the Invention

The present invention generally relates to computer systems having multiprocessor architectures and, more particularly, to a novel multi-processor computer system for processing memory accesses requests and the implementation of cache coherence in such multiprocessor systems.

2. Description of the Prior Art

To achieve high performance computing, multiple individual processors have been interconnected to form multiprocessor computer system capable of parallel processing. Multiple processors can be placed on a single chip, or several chips—each containing one or several processors—interconnected into a multiprocessor computer system.

Processors in a multiprocessor computer system use private cache memories because of their short access time (a cache is local to a processor and provides fast access to data) and to reduce number of memory requests to the main memory. However, managing caches in multiprocessor system is complex. Multiple private caches introduce the multi-cache coherency problem (or stale data problem) due to multiple copies of main memory data that can concurrently exist in the multiprocessor system.

Small scale shared memory multiprocessing system have processors (or groups thereof) interconnected by a single bus. However, with the increasing speed of processors, the feasible number of processors which can share the bus effectively decreases.

The protocols that maintain the coherence between multiple processors are called cache coherence protocols. Cache coherence protocols track any sharing of data block between the processors. Depending upon how data sharing is tracked, cache coherence protocols can be grouped into two classes: 1) Directory based and 2) Snooping.

In directory based approach, the sharing status of a block of physical memory is kept in just one location called the coherency directory. Coherency directories are generally large blocks of memory which keep track of which processor in the multiprocessor computer system owns which lines of memory. Disadvantageously, coherency directories are typically large and slow. They can severely degrade overall system performance since they introduce additional latency for every memory access request by requiring that each access to the memory go through the common directory.

FIG. 1 illustrates a typical prior art multiprocessor system 10 using the coherence directory approach for cache coherency. The multiprocessor system 10 includes a number of processors 15a, . . . , 15d interconnected via a shared bus 24 to the main memory 20a, 20b via memory controllers 22a, 22b, respectively. Each processor 15a, . . . , 15d has its own private cache 17a, . . . , 17d, respectively, which is N-way set associative. Each request to the memory from a processor is placed on the processor bus 24 and directed to the coherency directory 26. Frequently, in the coherency controller, a module is contained which tracks the location of cache lines held in particular subsystems to eliminated the need to broadcast unneeded snoop request to all caching agents. This unit is frequently labeled "snoop controller" or "snoop filter". All memory access requests from the I/O subsystem 28 are also directed to the coherency controller 26. Instead of the main memory, secondary cache connected to the main memory can be used. Processors can be grouped into processor clusters, where each cluster has its own cluster bus, which is then connected to the coherency controller 26. As each memory request goes through the coherence directory, additional cycles are added to each request for checking the status of the requested memory block.

In a snooping approach, no centralized state is kept, but rather each cache keeps the sharing status of data block locally. The caches are usually on a shared memory bus, and all cache controllers snoop (monitor) the bus to determine whether they have a copy of the data block requested. A commonly used snooping method is the "write-invalidate" protocol. In this protocol, a processor ensures that it has exclusive access to data before it writes that data. On each write, all other copies of the data in all other caches are invalidated. If two or more processors attempt to write the same data simultaneously, only one of them wins the race, causing the other processors' copies to be invalidated.

To perform a write in a write-invalidate protocol based system, a processor acquires the shared bus, and broadcasts the address to be invalidated on the bus. All processors snoop on the bus, and check to see if the data is in their cache. If so, these data are invalidated. Thus, use of the shared bus enforces write serialization.

Disadvantageously, every bus transaction in the snooping approach has to check the cache address tags, which could interfere with CPU cache accesses. In most recent architectures, this is typically reduced by duplicating the address tags, so that the CPU and the snooping requests may proceed in parallel. An alternative approach is to employ a multilevel cache with inclusion, so that every entry in the primary cache is duplicated in the lower level cache. Then, snoop activity is performed at the secondary level cache and does not interfere with the CPU activity.

FIG. 2 illustrates a typical prior art multiprocessor system 50 using the snooping approach for cache coherency. The multiprocessor system 50 contains number of processors 52a, . . . , 52c interconnected via a shared bus 56 to the main memory 58. Each processor 52a, . . . , 52c has its own private cache 54a, . . . , 54c which is N-way set associative. Each write request to the memory from a processor is placed on the processor bus 56. All processors snoop on the bus, and check their caches to see if the address written to is also located in their caches. If so, the data corresponding to this address are invalidated. Several multiprocessor systems add a module locally to each processor to track if a cache line to be invalidated is held in the particular cache, thus effectively reducing the local snooping activity. This unit is frequently labeled "snoop filter". Instead of the main memory, secondary cache connected to the main memory can be used.

With the increasing number of processors on a bus, snooping activity increases as well. Unnecessary snoop requests to a cache can degrade processor performance and each snoop requests accessing the cache directory consumes power. In addition, duplicating the cache directory for every processor to support snooping activity significantly increases the size of the chip. This is especially important for systems on a single chip with a limited power budget.

What now follows is a description of prior art references that address the various problems of conventional snooping approaches found in multiprocessor systems.

Particularly, U.S. Patent Application US2003/0135696A1 and U.S. Pat. No. 6,704,845B2 both describe replacement policy methods for replacing entries in the snoop filter for a coherence directory based approach including a snoop filter. The snoop filter contains information on cached memory blocks—where the cache line is cached and its status. The U.S. Patent Application US2004/0003184A1 describes a snoop filter containing sub-snoop filters for recording even and odd address lines which record local cache lines accessed by remote nodes (sub-filters use same filtering approach). Each of these disclosures do not teach or suggest a system and method for locally reducing the number of snoop requests presented to each cache in a multiprocessor system. Nor do they teach or suggest coupling several snoop filters with various filtering methods, nor do they teach or suggest providing point-to-point interconnection of snooping information to caches.

U.S. Patent Applications US2003/0070016A1 and US2003/0065843A1 describe a multi-processor system with a central coherency directory containing a snoop filter. The snoop filter described in these applications reduces the number of cycles to process a snoop request, however, does not reduce the number of snoop requests presented to a cache.

U.S. Pat. No. 5,966,729 describes a multi-processor system sharing a bus using a snooping approach for cache coherence and a snoop filter associated locally to each processor group. To reduce snooping activity, a list of remote processor groups "interested" and "not-interested" in particular cache line is kept. Snoop requests are forwarded only to the processor groups marked as "interested" thus reducing the number of broadcasted snoop requests. It does not describe how to reduce the number of snoop requests to a local processor, but rather how to reduce the number of snoop requests sent to other processor groups marked as "not interested". This solution requires keeping a list with information on interested groups for each line in the cache for a processor group, which is comparable in size to duplicating the cache directories of each processor in the processor group thus significantly increasing the size of chip.

U.S. Pat. No. 6,389,517B1 describes a method for snooping cache coherence to allow for concurrent access on the cache from both the processor and the snoop accesses having two access queues. The embodiment disclosed is directed to a shared bus configuration. It does not describe a method for reducing the number of snoop requests presented to the cache.

U.S. Pat. No. 5,572,701 describes a bus-based snoop method for reducing the interference of a low speed bus to a high speed bus and processor. The snoop bus control unit buffers addresses and data from the low speed bus until the processor releases the high speed bus. Then it transfers data and invalidates the corresponding lines in the cache. This disclosure does not describe a multiprocessor system where all components communicate via a high-speed bus.

A. Moshovos, G. Memik, B. Falsafi and A. Choudhary, in a reference entitled "JETTY: filtering snoops for reduced energy consumption in SMP servers" ("Jetty") describe several proposals for reducing snoop requests using hardware filter. It describes the multiprocessor system where snoop requests are distributed via a shared system bus. To reduce the number of snoop requests presented to a processor, one or several various snoop filters are used.

However, the system described in Jetty has significant limitations as to performance, supported system and more specifically interconnect architectures, and lack of support for multiporting. More specifically, the approach described in Jetty is based on a shared system bus which established a common event ordering across the system. While such global time ordering is desirable to simplify the filter architecture, it limited the possible system configurations to those with a single shared bus. Alas, shared bus systems are known to be limited in scalability due to contention to the single global resource. In addition, global buses tend to be slow, due to the high load of multiple components attached to them, and inefficient to place in chip multiprocessors.

Thus, in a highly optimized high-bandwidth system, it is desirable to provide alternate system architectures, such as star, or point-to-point implementations. These are advantageous, as they only have a single sender and transmitter, reducing the load, allowing the use of high speed protocols, and simplifying floor planning in chip multiprocessors. Using point to point protocols also allows to have several transmissions in-progress simultaneously, thereby increasing the data transfer parallelism and overall data throughput.

Other limitations of Jetty include the inability to perform snoop filtering on several requests simultaneously, as in Jetty, simultaneous snoop requests from several processors have to be serialized by the system bus. Allowing the processing of several snoop requests concurrently would provide a significant increase in the number of requests which can be handled at any one time, and thus increase overall system performance.

Having set forth the limitations of the prior art, it is clear that what is required is a system incorporating snoop filters to increase overall performance and power efficiency without limiting the system design options, and more specifically, methods and apparatus to support snoop filtering in systems not requiring a common bus.

Furthermore, there is a need for a snoop filter architecture supporting systems using point-to-point connections to allow the implementation of high performance systems using snoop filtering.

There is a further need for the simultaneous operation of multiple snoop filter units to concurrently filter requests from multiple memory writers to increase system performance.

There is farther a need to provide novel, high performance snoop filters which can be implemented in a pipelined fashion to enable high system clock speeds in systems utilizing such snoop filters.

There is an additional need for snoop filters with high filtering efficiency transcending the limitations of prior art.

SUMMARY OF THE INVENTION

It is therefore an object of the present invention to provide a simple method and apparatus for reducing the number of snoop requests presented to a single processor in cache coherent multiprocessor systems.

It is a further object of the present invention to provide a simple method and apparatus for supporting snoop filtering in multiprocessor system architectures based on point-to-point interconnect fabrics. While prior art has allowed snoop filtering to be used only in bus-based system, the present invention teaches how to advantageously use snoop filtering in conjunction with point to point protocols by permitting several transmissions in-progress simultaneously, thereby increasing the data transfer parallelism and overall data throughput.

According to the invention, there is provided a system and method for supporting cache coherency in a multiprocessor computing environment having multiple processing units, each processing unit having one or more local cache memories associated therewith and operatively connected via a first communications means, the system comprising:

a snoop filter device associated with each processing unit, each snoop filter device having a plurality of dedicated input ports for receiving snoop requests from dedicated memory writing sources in the multiprocessor computing environment;

a point-to-point interconnect means comprising communication links for directly connecting said memory writing sources to the dedicated input ports of all other snoop filter devices associated with all other processing devices of said multiprocessor computing environment;

each snoop filter device further having a plurality of parallel operating port snoop filters in correspondence with the plurality of dedicated input ports, the plurality of port snoop filters adapted to concurrently filter snoop requests received from respective dedicated memory writing sources and forward a subset of those requests to its associated processing unit, whereby a number of snoop requests forwarded to a processing unit is significantly reduced thereby increasing performance of the computing environment.

In accordance with the present invention, each snoop filter device further comprises a plurality of processor snoop filter queue means in correspondence with the plurality of port snoop filters for receiving, enqueing, and forwarding the subset of snoop requests to the associated processor unit of the snoop filter device.

Furthermore, a token-based flow control system is implemented for each point to point communication link to limit the number of simultaneously outstanding requests, and prevent processor snoop filter queue overflow conditions.

Advantageously, the present invention enables snoop filtering to be performed on several requests simultaneously, while in the prior art systems, simultaneous snoop requests from several processors have to be serialized by the system bus. Allowing the processing of several snoop requests concurrently provides a significant increase in the number of requests which can be handled at any one time, and thus increase overall system performance.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
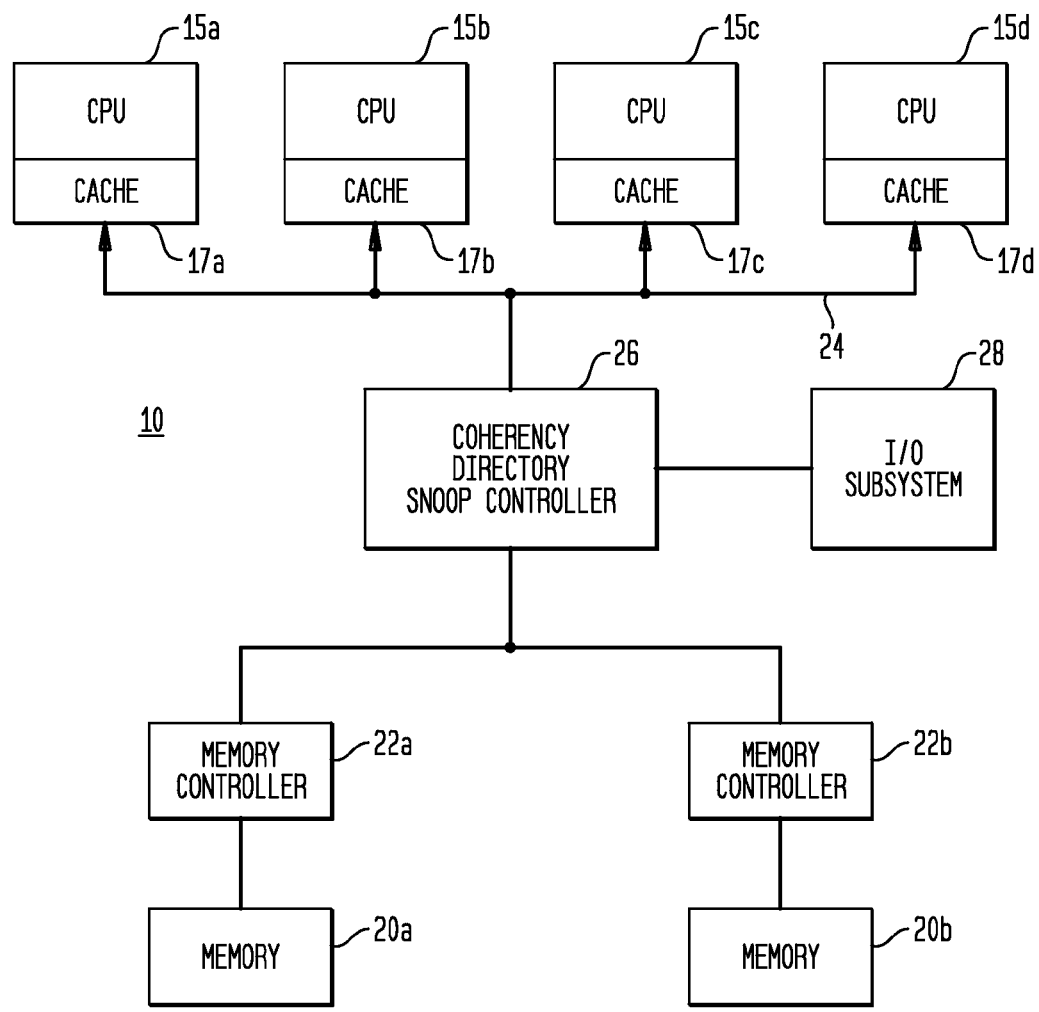
FIG. 1 depicts a base multiprocessor architecture with the coherence directory for cache coherency according to the prior art.
Figure 2:
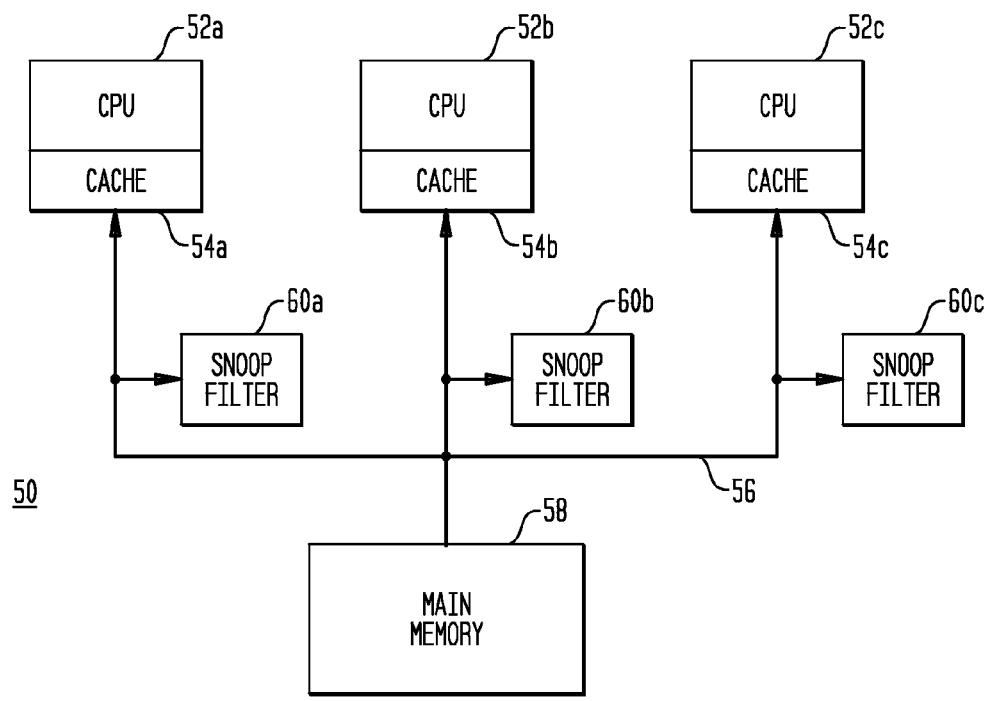
FIG. 2 depicts a base multiprocessor system using snooping approach for cache coherency according to the prior art.
Figure 3:
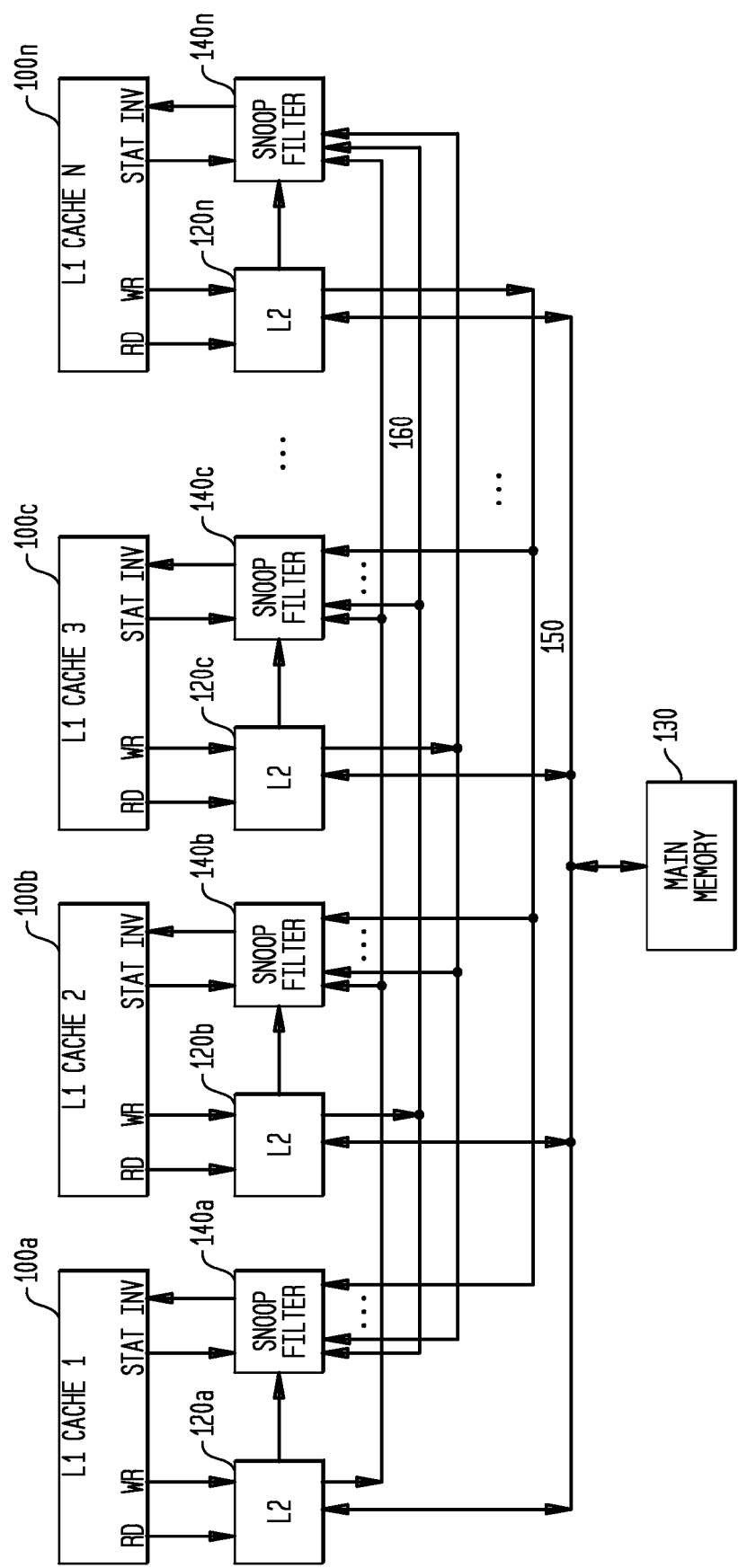
FIG. 3 depicts a base multiprocessor system using snooping approach for cache coherency using a point-to-point connection described according to the present invention.

Referring now to drawings, and more particularly to FIG. 3, there is shown the overall base architecture of the multiprocessor system with the use of snooping approach for cache coherency. In the preferred embodiment, the multiprocessor system is composed of N processors $100a, \ldots, 100n$ (or CPUs labeled $DCU_1$ to $DCU_N$) with their local L1 data and instruction caches, and their associated L2 caches $120a, \ldots, 120n$. The main memory 130 is shared and can be implemented on-chip or off-chip. In the alternative embodiment, instead of main memory, a shared L3 with access to main memory can be used. In the preferred embodiment, the processor cores $100a, \ldots, 100n$ are PowerPC cores such as PPC440 or PPC405, but any other processor core can be used, or some combination of various processors in a single multiprocessor system can be used without departing from the scope of this invention. The processor cores $100a, \ldots, 100n$ are interconnected by a system local bus 150.

To reduce the number of snoop requests presented to a processor, and thus to reduce the impact of snooping on processor and system performance, and to reduce power consumed by unnecessary snoop requests, a snoop filter 140a, . . . , 140n is provided for each respective processor core 100a, . . . , 100n in the multiprocessor system 10. For transferring snooping requests, the preferred embodiment does not use the system bus 150, as typically found in prior art systems, but rather implements a point-to-point interconnection 160 whereby each processor's associated snoop filter is directly connected with each snoop filter associated with every other processor in the system. Thus, snoop requests are decoupled from all other memory requests transferred via the system local bus, reducing the congestion of the bus which is often a system bottleneck. All snoop requests to a single processor are forwarded to the snoop filter 140a, . . . , 140n, which comprises several sub-filters with the same filtering method, or with several different filtering methods, or any combination of the two, as will be described in greater detail herein. The snoop filter processes each snoop request, and presents only a fraction of all requests which are possibly in the processor's cache to the processor.

For each processor, snoop requests are connected directly to all other processors' snoop filters using a point-to-point interconnection 160. Thus, several snoop requests (resulting from write and invalidate attempts) from different processors can occur simultaneously. These requests are no longer serialized, as in the typical snooping approach using the system bus, where this serialization is performed by the bus. That is, multiple snoop requests can be processed in the snoop filter concurrently, as will be described herein in further detail. As a processor has only one snoop port, the snoop requests not filtered out by a snoop filter will be serialized in a queue to be presented to the processor. However, the number of requests passed to the processor is much less than the pre-filtered number of all snoop requests, reducing the impact of cache coherence implementation on system performance.

To prevent queue overflowing condition of the queues contained in the snoop filter block, a token-based flow control system is implemented for each point to point link to limit the number of simultaneously outstanding requests. According to the token-based flow control, each memory writer can send the next write request—which also initiates snoop requests to all other processor units and accompanied snoop filter blocks—only if it has tokens available for all ports of the snoop filter blocks it has a direct point-to-point connection. If there are no tokens available from at least one of the remote ports it is connected to, no snoop requests can be sent out from this memory writer until at least one token from the said snoop filter port gets available again.

Figure 4:
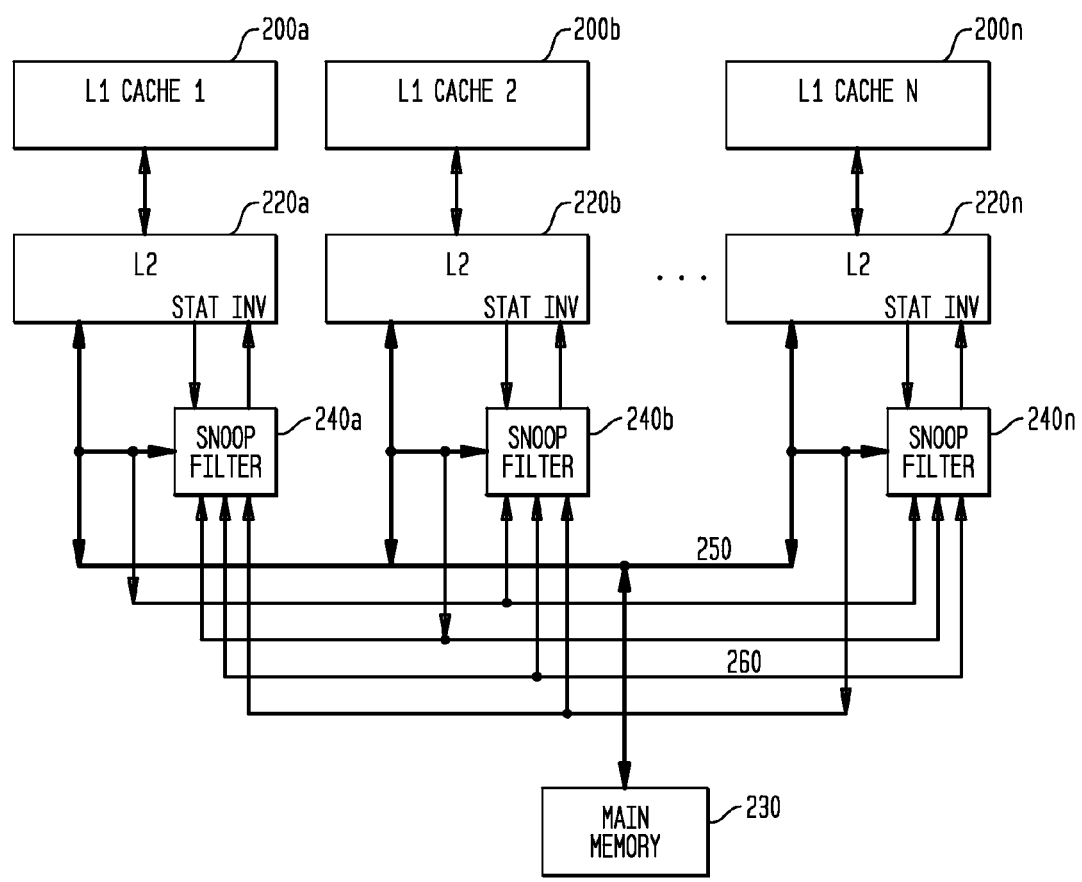
FIG. 4 illustrates an alternative embodiment base multiprocessor system using snooping approach for cache coherency using point-to-point connection where snoop filter is placed between the L2 cache and the main memory.

FIG. 4 illustrates an alternative embodiment of this invention, with a base multiprocessor system using a snooping approach for cache coherency with point-to-point interconnection for snooping requests, wherein the snoop filter is placed between the L2 cache and the main memory 230. The multiprocessor system according to this embodiment thus comprises N processors 200a, . . . , 200n (or CPUs labeled $DCU_1$ to $DCU_N$) with their local L1 data and instruction caches, and their associated L2 caches 220a, . . . , 220n. The main memory 230 is shared and can be implemented on-chip or off-chip. In the alternative embodiment, instead of main memory, a shared L3 cache with access to main memory can be used. All memory access requests from processors 200a, . . . , 200n are transferred via a system local bus 250. In the embodiment depicted in FIG. 4, each of the processors in the multiprocessor system is paired with a respective snoop filter 240a, . . . , 240n. The point-to-point interconnection 260 is used to transfer snoop requests in the preferred embodiment in order to reduce the congestion of the system bus. In this point-to-point connection scheme 260, each processor's associated snoop filter is directly connected with each snoop filter associated with every other processor in the system. All snoop requests to a single processor are forwarded to its snoop filter, which processes each snoop request, and forwards only an appropriate fraction of all requests to the processor. In this embodiment, the snoop requests are filtered at the L2 cache level (not at L1, as in the previous embodiment illustrated in FIG. 3), but the presented invention is applicable to any cache level, and can be used for other levels of the cache hierarchy without departing from the scope of the invention.

Figure 5:
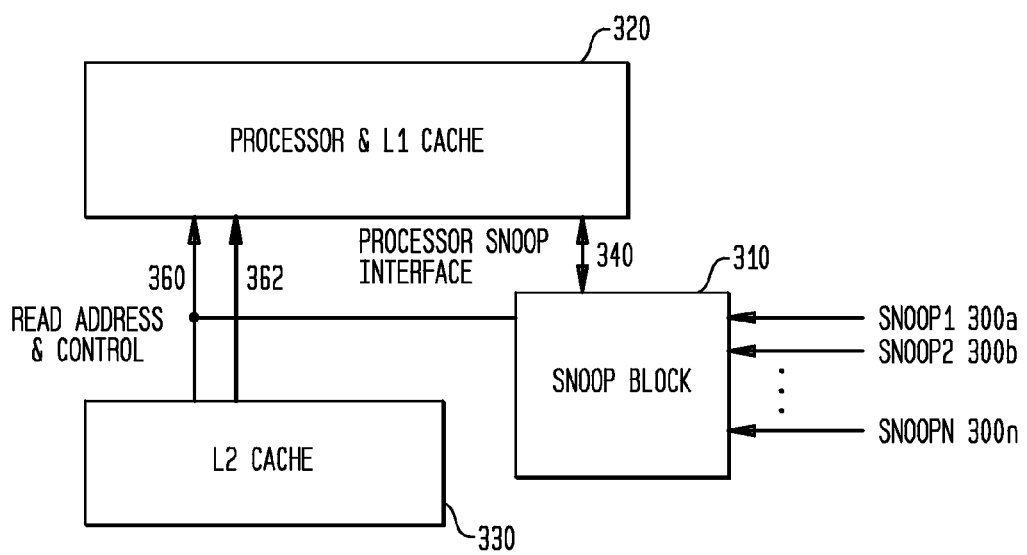
FIG. 5 depicts a high level schematic of a snoop filter block in accordance with a preferred embodiment of the invention.

Referring now to FIG. 5, there is depicted a high level block diagram of the snoop filter device according to the present invention. Snoop requests from all other processors 1 to N in a multiprocessor system are forwarded to the snoop block 310 via dedicated point-to-point interconnection inputs 300a, . . . , 300n. The snoop block 310 filters the incoming snoops and forwards the appropriate subset to the processor 320 via the processor snoop interface 340. In addition, the snoop block 310 monitors all memory access requests from the processor and L1 data cache block 320 to the L2 cache 330. These are only requests which miss in the L1 cache. The snoop block monitors all read address and control signals 360 and 362 to update its filters accordingly.

Figure 6:
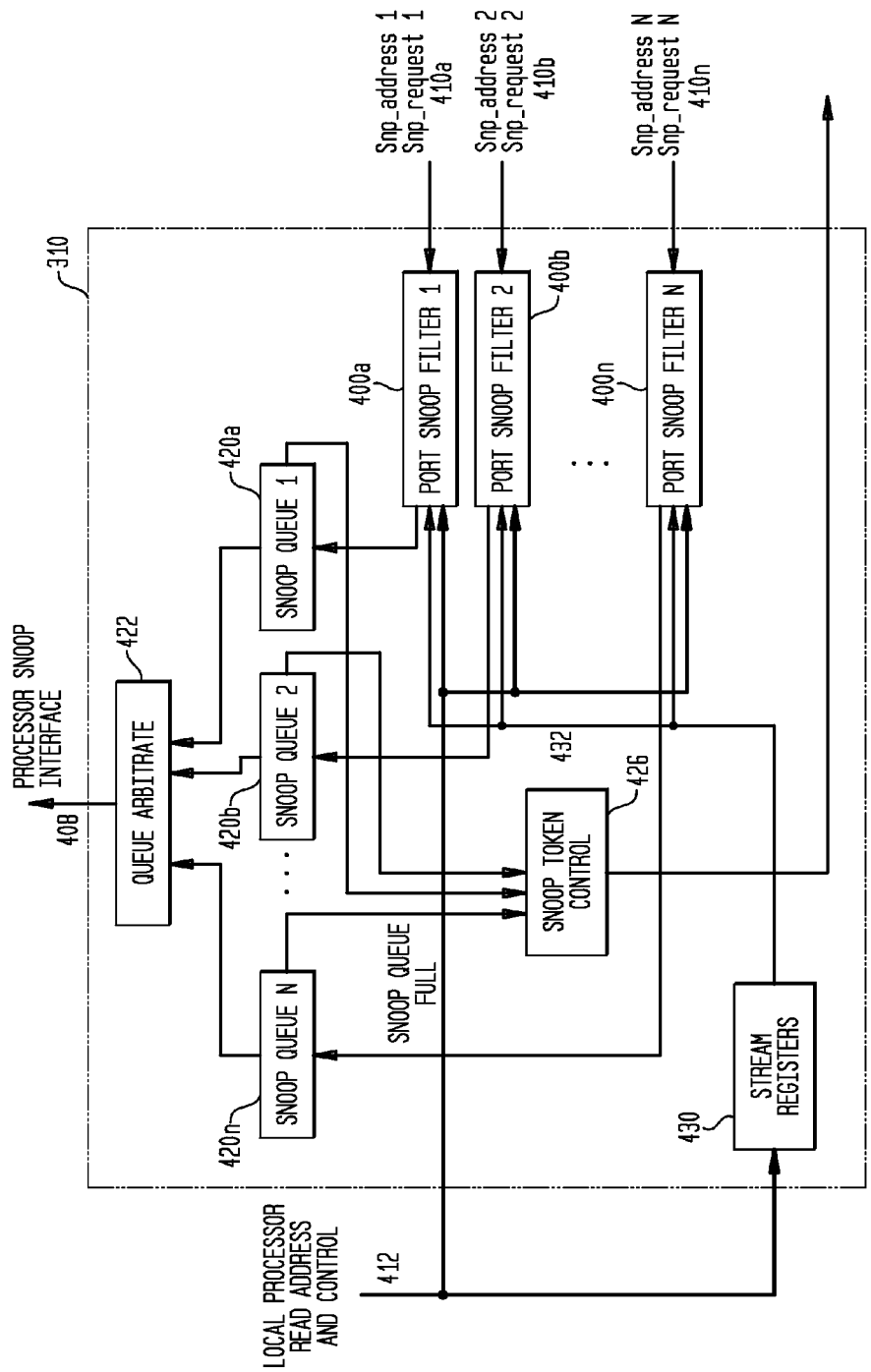
FIG. 6 is a high level schematic of the snoop block containing multiple snoop filters according to the present invention.

FIG. 6 depicts a high level schematic of the snoop block 310 depicted in FIG. 5. As shown in FIG. 6, the snoop block 310 includes multiple ("N") port snoop filters 400a, . . . , 400n that operate in parallel, with each dedicated only to one source of N memory writers (processors or a DMA engine sub-system, etc.). Each of the port snoop filters 400a, . . . , 400n receive on its dedicated input 410a, . . . , 410n snoop requests from a single source which is directly connected point-to-point. As will be described herein, a single port snoop filter may include a number of various snoop filter methods. The snoop block 310 additionally includes a stream register block 430 and snoop token control block 426. In addition, each port snoop filter 400a, . . . , 400n monitors all memory read access requests 412 from its associated processor which miss in the processor's L1 level cache. This information is also provided to the stream register block 430 for use as will be described in greater detail herein.

In operation, the port snoop filters 400a, . . . , 400n process the incoming snoop requests and forward a subset of all snoop requests to a respective snoop queue 420a, . . . , 420n having one queue associated with each snoop port. A queue arbitration block 422 is provided that arbitrates between all the snoop queues 420 and serializes all snoop requests from the snoop queues 420 fairly. Logic is provided to detect a snoop queue overflow condition, and the status of each queue is an input to a snoop token control unit 426 that controls flow of snoop requests from the remote memory writers. A memory writer—being a processor or a DMA engine—can submit a write to the memory and a snoop request to all snoop filters only if it has a token available from all snoop filters. The only snoop filter from which a processor does not need a token available to submit a write is its own local snoop filter. This mechanism ensures that the snoop queues do not overflow. From the snoop queue selected by arbiter 422, snoop requests are forwarded to the processor via a processor snoop interface 408.

Figure 7:
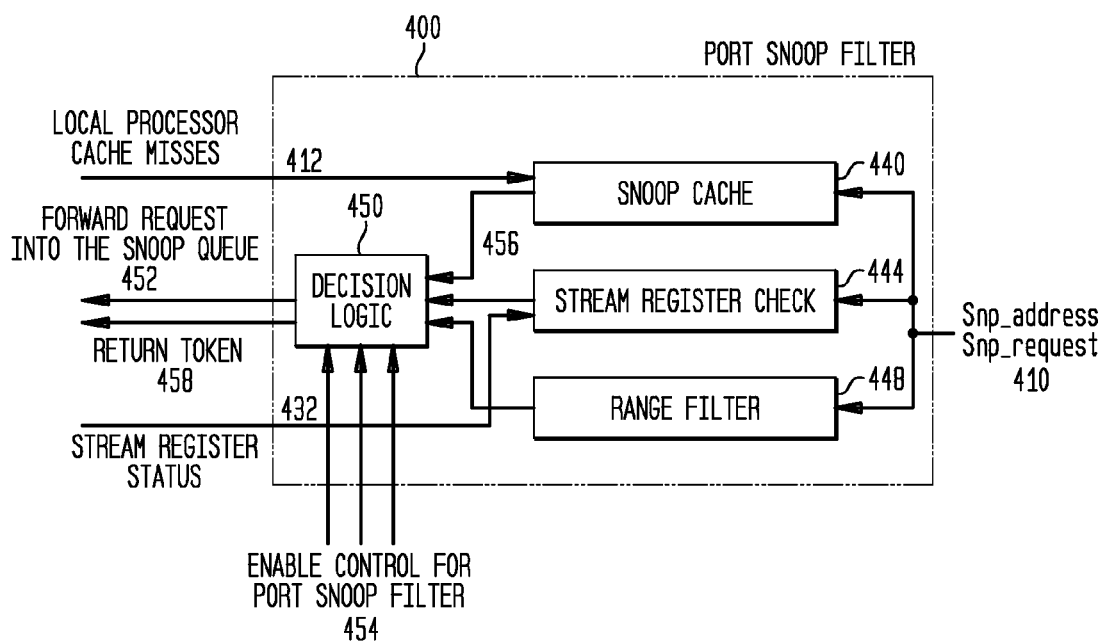
FIG. 7 illustrates a high level schematic of a single snoop port filter according to the present invention.

FIG. 7 illustrates a high level schematic of a single snoop port filter 400. The snoop port filter block 400 includes multiple filter units which implement various filtering algorithms. In the preferred embodiment, three snoop filter blocks 440, 444, and 448 operate in parallel, each implementing a different snoop filter algorithm. The snoop filter blocks are labeled snoop cache 440, stream register check unit 444, and range filter 448. In one embodiment, each of the parallel snoop filter blocks receives on its input an identical snoop request 410 from a single source simultaneously. In addition, the snoop cache 440 monitors all memory read access requests 412 from the processor which miss in the L1 level cache, and stream registers check unit 444 receives status input 432 from the stream register unit 430 depicted in FIG. 6.

According to the preferred embodiment, the snoop cache block 440 filters the snoop requests 410 using an algorithm which is based on the temporal locality property of snoop requests, meaning that if a single snoop request for a particular location was made, it is probable that another request to the same location will be made soon. The snoop cache monitors every load made to the local cache, and updates its status, if needed. The stream register check block 444 filters snoop requests 410 using an algorithm that determines a superset of the current local cache content. The approximation of cache content is included in the stream registers block 430 (FIG. 6), and the stream register status 432 is forwarded to each snoop port filter 400. Based on this status, for each new snoop requests 410, a decision is made if the snoop address can possibly be contained in the local cache. The third filtering unit in the snoop port filter is the range filter 448. For this filtering approach, two range addresses are specified, the minimum range address and the maximum range address. The filtering of a snoop request is performed by first determining if the snoop request is within the address range determined by these two range addresses. If this condition is met, the snoop request is discarded; otherwise, the snoop request is forwarded to the decision logic block 450. Conversely, the request can be forwarded when it falls within the address range and discarded otherwise, without departing from the scope of the invention. Particularly, the decision logic block 450 receives results 456 of all three filter units 440, 444 and 448 together with the control signals 454 which enable or disable each individual snoop filter unit. Only results of snoop filter units for which the corresponding control signals are enabled are considered in each filtering decision. If any one of the filtering units 440, 444 or 448 decides that a snoop request 410 should be discarded, the snoop request is discarded. The resulting output of this unit is either to add the snoop request to the corresponding snoop queue 452, or to discard the snoop request and return a snoop token 458 to the remote processor or DMA unit that initiated the discarded snoop request.

In the preferred embodiment, only the three filtering units implementing the algorithms above described are included in a port snoop filter, but one skilled in the art will appreciate that any other number of snoop filter units can be included in a single port snoop filter, or that some other snoop filter algorithm may be implemented in the port snoop filter, or a combination of snoop algorithms can be implemented, without departing from the scope of the invention.

Figure 8A:
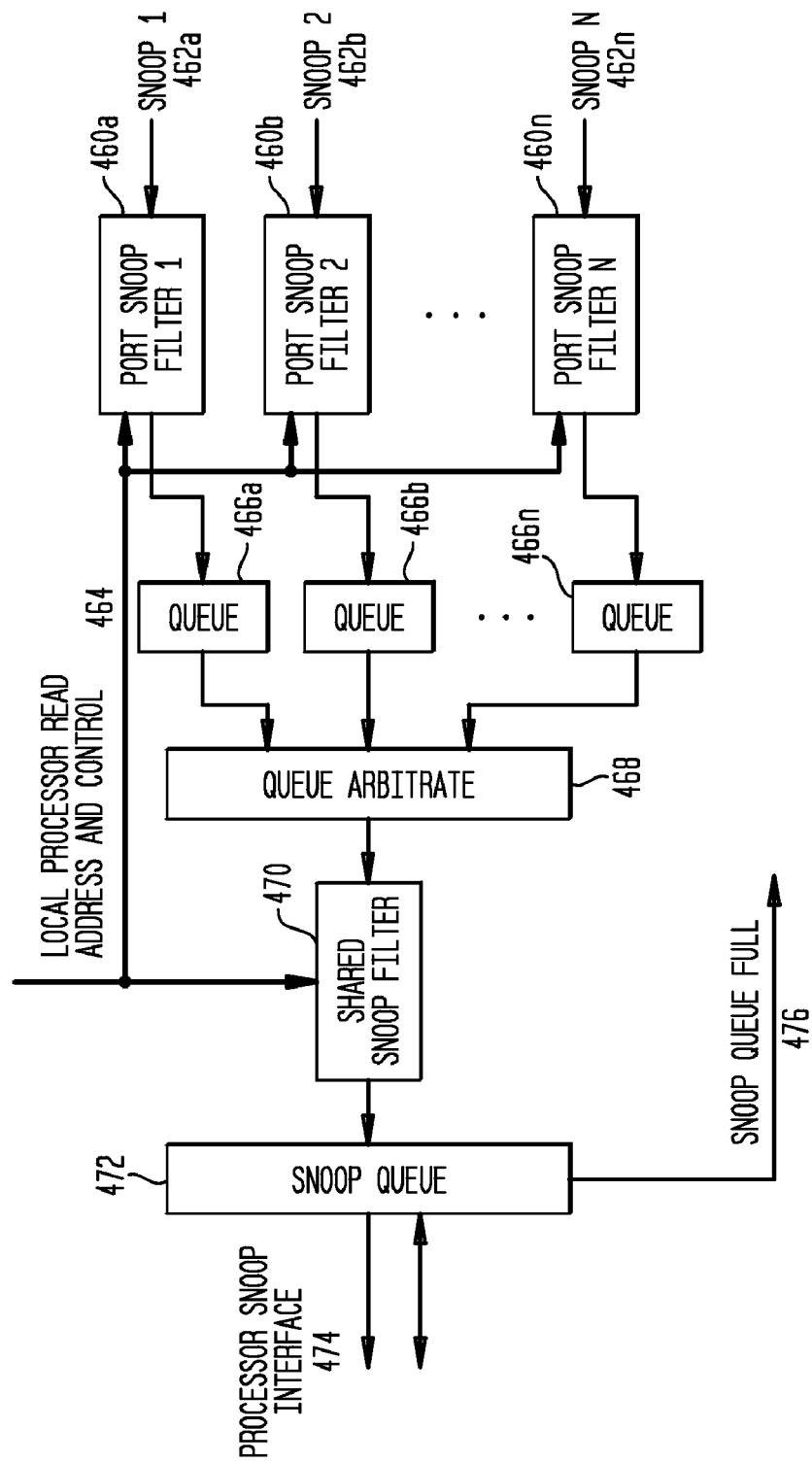
FIGS. 8(a) and 8(b) depict high level schematics of two alternative embodiments of the snoop block according to the present invention.
Figure 8B:
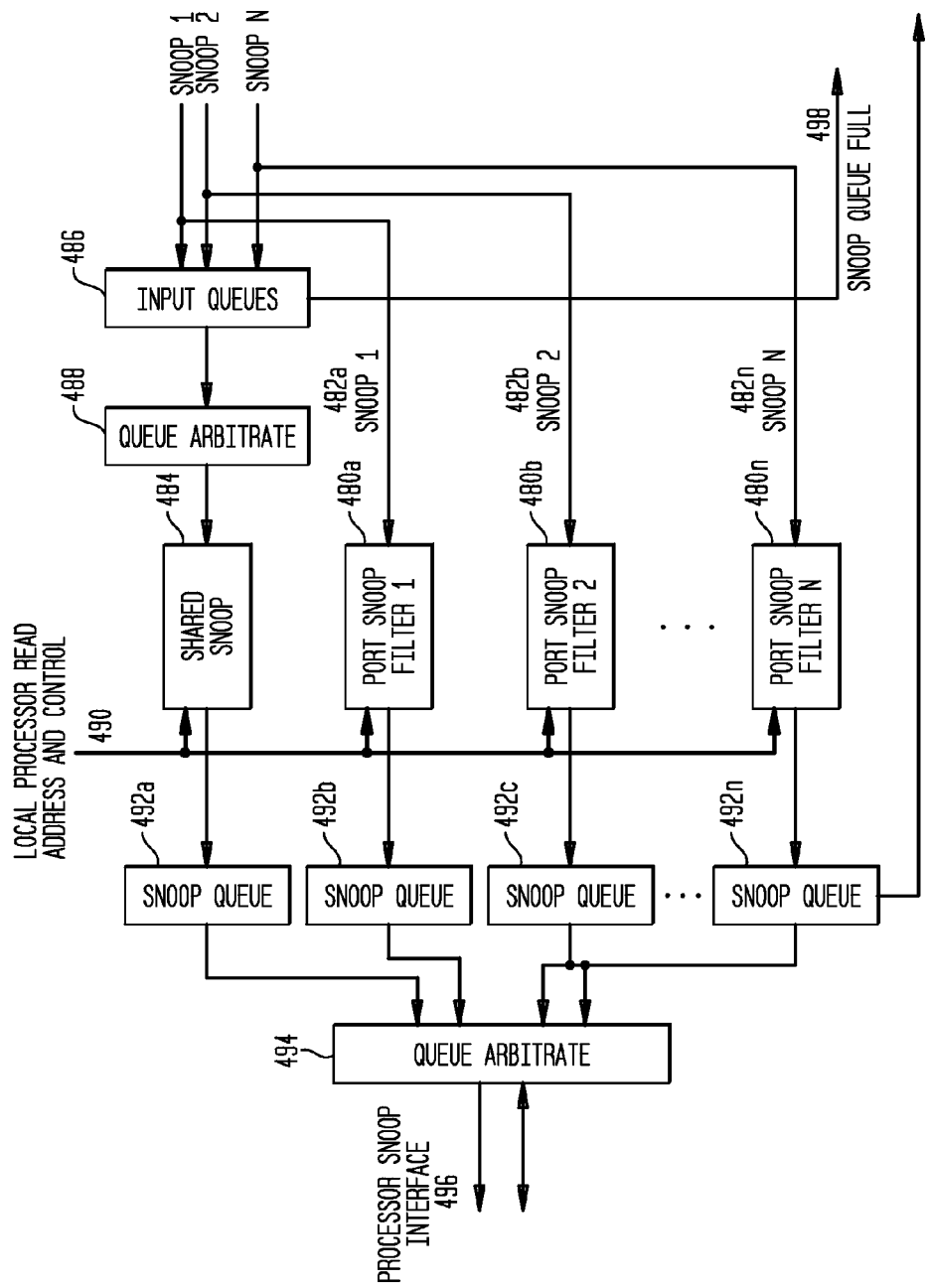

FIGS. 8(a) and 8(b) depict high level schematics of two alternative embodiments of the snoop filter block 310 of FIG. 6. As described herein with respect to FIG. 6, the snoop block may include multiple snoop filters that can use various filtering approaches, the sane filtering approach, or a combination of the two. As shown in FIG. 8(a), N port snoop filters 460a, . . . , 460n operate in parallel, one for each of N remote memory writers. Each of the port snoop filters 460a, . . . , 460n receive on its respective input 462a, . . . , 462n snoop requests from a single dedicated source which is connected point-to-point. In addition, each snoop filter 460a, . . . , 460n monitors all of the local processor's memory load requests 464 which have missed in the L1 level cache. Other signals from other units of the snoop block may also be needed to supply to the port snoop filters, if required by the filter algorithm implemented. The exact signals needed are determined by the one or more snoop filter algorithms implemented in a single port snoop filter 460. Additionally, it should be understood that all port snoop filters do not have to implement the same set of filtering algorithms.

The port snoop filters 460a, . . . , 460n filter the incoming snoops and forward the appropriate unfiltered subset of snoop requests into the respective queues 466a, . . . , 466n and the queue arbitration block 468. Here, the snoop requests are serialized and presented to a next snoop filter 470, which handles inputs from all remote memory writers. This shared snoop filter 470 processes all snoop request presented and forwards a subset of all requests to the snoop queue 472. From the snoop queue 472, snoop requests are forwarded to the processor via the processor snoop interface 474. It should be understood that it is possible to have multiple or no shared snoop filters 470 instead of the configuration shown in FIG. 8(a). In the case of multiple shared filters, the filters may be arranged in parallel or in series (in which case the output of one filter is the input to the next, for example). If a filter has inputs from more than one source (i.e., is shared between multiple sources), it has to have its own input queue and an arbiter to serialize snoop requests. A final ordered subset of all snoop requests is placed in the snoop queue 472, and snoop requests are forwarded to the processor via the processor snoop interface 474. Optionally, a snoop queue full indication signal 476 is provided that indicates when the snoop queue is full in order to stop some or all remote memory writers from issuing further snoop requests until the number of snoops in the snoop queue falls below a predetermined level.

Similarly, FIG. 8(b) illustrates another embodiment with an alternative organization of the snoop filters in the snoop block 310. N port snoop filters 480a, . . . , 480n, each receiving only snoop requests from one of N remote memory writers (i.e., excluding the processor where the snoop filter is attached), operate in parallel. Each port snoop filter 480a, . . . , 480n receives on its respective input snoop requests 482a, . . . , 482n from only a single source, respectively. A shared snoop filter 484 is connected in parallel with the port snoop filter devices 480a, . . . , 480n. In an alternative embodiment, more than one shared snoop filter can be attached in parallel. The shared snoop filter 484 handles inputs from all N remote memory writers. Having more than one input, the shared filter 484 has its own input queues 486 and a queue arbiter 488 for serializing snoop requests. Further in the embodiment depicted in FIG. 8b), all port snoop filters 480a, . . . , 480n and the shared snoop filter 484 monitor all memory read access requests 490 from the local processor which miss in the L1 level cache. The snoop filters 480a, . . . , 480n and 484 filter the incoming snoop requests and forward the appropriate unfiltered subset to the input queue of the next shared snoop filter 492a, . . . , 492n. Here, the unfiltered snoop requests are serialized by the queue arbiter 494, and are forwarded to the processor via the processor snoop interface 496. If one of the snoop queue devices 492a, . . . , 492n or 486 is full, a snoop queue full indication 498 is activated to stop all (or some of) the remote memory writers from issuing further snoop requests until the number of snoops in the snoop queue falls below a the predetermined level.

Figure 9:
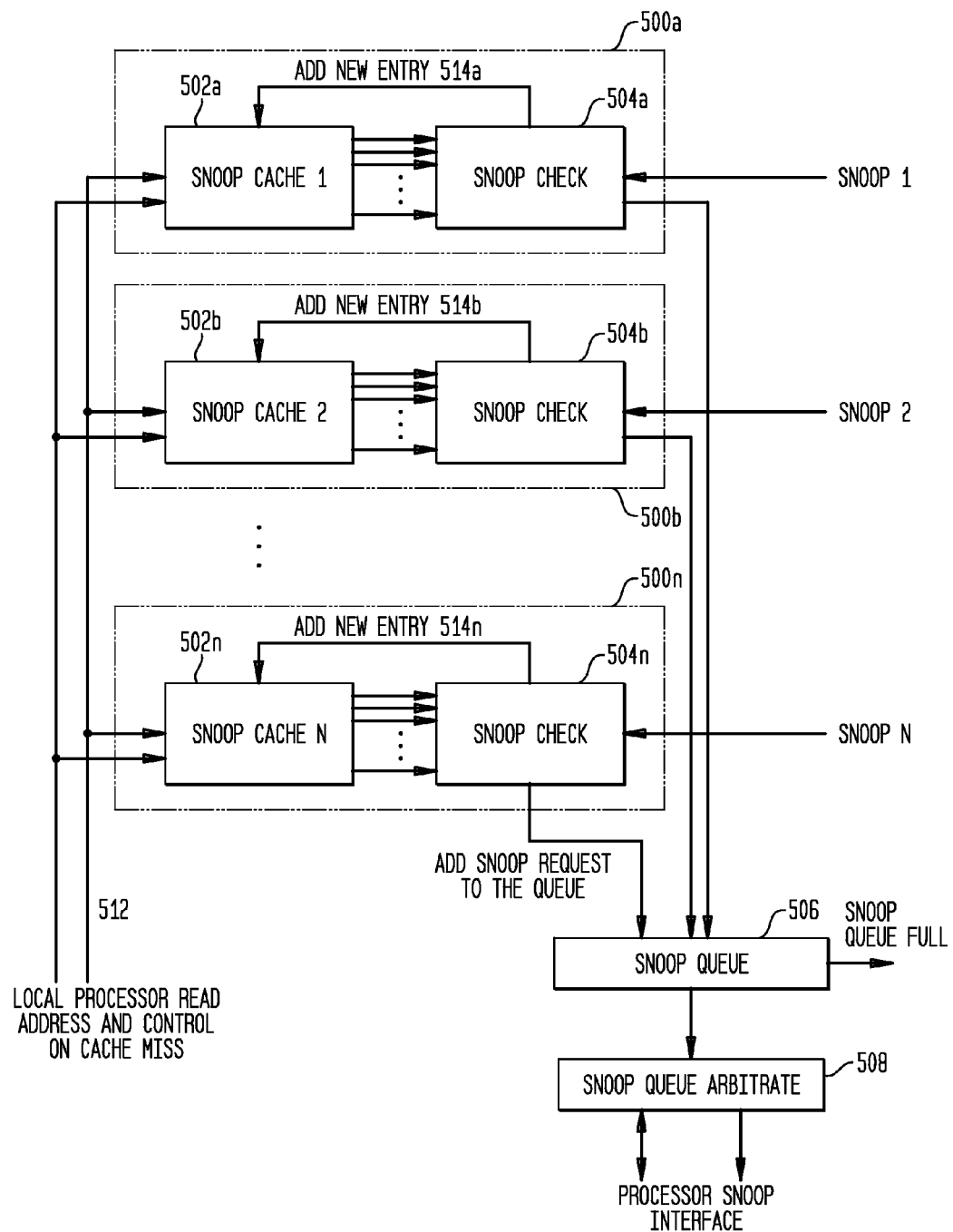
FIG. 9 is a is a high level schematic of the snoop block including multiple port snoop filters according to a further embodiment of the present invention.

Referring now to FIG. 9, there is depicted a further embodiment of the snoop filter block 310. The block contains N port snoop filters 500a, . . . , 500n, corresponding to port snoop filters 400, 460a, . . . , 460n, and 480a, . . . , 480n (of FIGS. 8(a) and 8(b)). Each port snoop filter 500a, . . . , 500n includes a snoop cache device 502a, . . . , 502n, and a snoop check logic 504a, . . . , 504n. The snoop cache devices 502a, . . . , 502n implement a snoop filtering algorithm which keeps track of recent snoop requests from one source, where the source of snoop requests can be another processor, a DMA engine, or some other unit. For each new snoop request from a single source, the snoop request's address is checked against the snoop cache in the snoop check logic block 504. If the result of this comparison matches, i.e., the snoop request is found in the snoop cache, the snooped data is guaranteed not to be in the local L1 level cache of the processor. Thus, no snoop request is forwarded to the snoop queue 506 and the snoop queue arbiter 508. If no match is found in the snoop cache 502a, . . . , 502n for the current snoop request, the address of the snoop requests is added to the snoop cache using the signals 514a, . . . , 514n. Concurrently, the snoop request is forwarded to the snoop queue 506.

All snoop cache devices 502a, . . . , 502n also receive read addresses and requests 512 from the local processor, and compare the memory read access addresses to the entries in the snoop cache 502a, . . . , 502n. If a request matches one of the entries in the snoop cache, this entry is removed from the snoop cache, as now the cache line is going to be located in the processor's first level cache. In the preferred embodiment, multiple snoop caches operating in parallel are used, each keeping track of snoop requests from a single remote memory writer. After filtering, a fraction of unfiltered snoop requests can be forwarded to the next port snoop filter, or they can be queued for one or more shared snoop filters, or they are placed in the snoop queue of the processor interface, depending on the embodiment.

It is understood that a single snoop cache device 502 includes an internal organization of M cache lines (entries), each entry having two fields: an address tag field, and a valid line vector. The address tag field of the snoop cache is typically not the same as the address tag of the L1 cache for the local processor, but it is shorter by the number of bits represented in the valid line vector. Particularly, the valid line vector encodes a group of several consecutive cache lines, all sharing the same upper bits represented by the corresponding address tag field. Thus, the n least significant bits from an address are used for encoding $2^n$ consecutive L1 cache lines. In the extreme case when n is zero, the whole entry in the snoop cache represents only one L1 cache line. In this case, the valid line vector has only one bit corresponding to a "valid" bit.

The size of the address tag field in the snoop cache is determined by the size of the L1 cache line and the number of bits used for encoding the valid line vector. In an example embodiment, for an address length of 32 bits (31:0), an L1 cache line being 32 bytes long, and a valid line vector of 32 bits, address bits (31:10) are used as the address tag field, (bit 31 being the most significant), address bits (9:5) are encoded in the valid line vector, and address bits (4:0) are ignored because they encode the cache line byte offset. As an illustration, three snoop caches for three different memory writers (N=3) are listed below, each snoop cache having M=4 entries, with address tag field to the left, and with 5 bits from the address used to encode the valid line vector to track 32 consecutive cache lines:

| Snoop requests source 1 |
| --- |
| Entry 1: 01c019e 00000000000000000010000000000000 |
| Entry 2: 01c01a0 00000000000000000000000100000000 |
| Entry 3: 01c01a2 00000000000000000000000000010000 |
| Entry 4: 01407ff 00000000000000000000000110000000 |

| Snoop requests source 2 |
| --- |
| Entry 1: 01c01e3 00010000000000000000000000000000 |
| Entry 2: 01c01e5 00000001000000000000000000000000 |
| Entry 3: 01c01e7 00000000000100000000000000000000 |
| Entry 4: 0140bff 00000000000000000000000110000000 |
| Snoop requests source 3 |
| Entry 1: 01c0227 00000000000000000001000000000000 |
| Entry 2: 01c0229 00000000000000000000000100000000 |
| Entry 3: 01c022b 00000000000000000000000000010000 |
| Entry 4: 0140fff 00000000000000000000000110000000 |

In this example, entry 1 of the source 1 snoop cache has recorded the cache line address 38033cc hexadecimal (with least significant 5 bits of address for byte offset removed). For this cache line address, the address tag is 1c109e. This cache line has been invalidated recently and cannot possibly be in the L1 cache. Therefore, the next snoop request to the same cache line will be filtered out (discarded). Similarly, entry 4 of the source 1 snoop cache will cause snoop requests for cache line addresses 280ffe7 (address tag 01407ff) and 280ffe8 to be filtered out.

Figure 10:
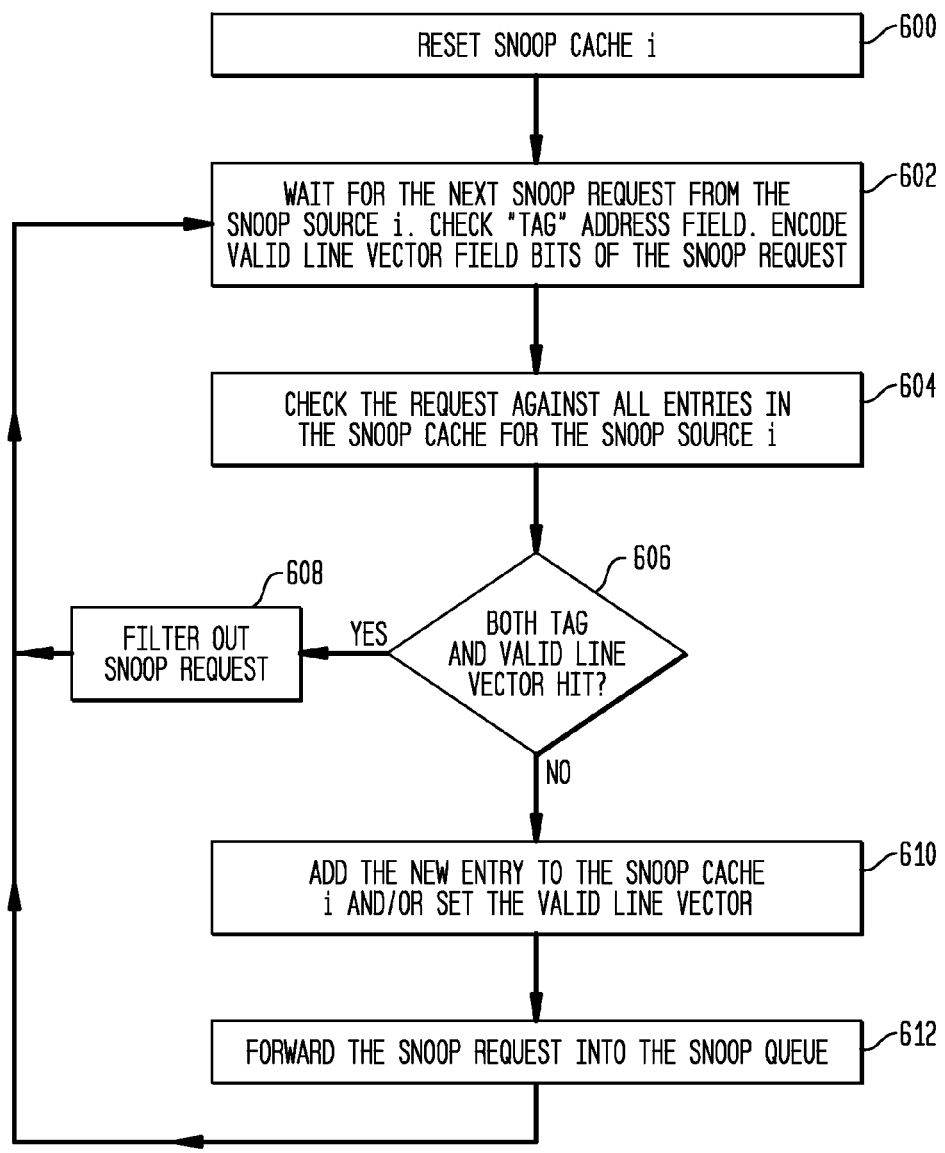
FIG. 10 depicts the control flow for the snoop filter implementing snoop cache for a single snoop source according to the present invention.

Referring now to FIG. 10, the control flow for the snoop filter implementing a snoop cache device for a single snoop source is shown. At the start of operation, all M lines in the snoop cache are reset as indicated at step 600, When a new snoop request from a snoop source i is received, the address of the snoop request is parsed into the "address tag" field 526 and into bits used for accessing the valid line vector 524. The valid line vector of the snoop request has only one bit corresponding to each L1 cache with address bits matching the address tag field. This is performed in the step 602. In the step 604, the "tag" field of the snoop request is checked against all tag fields in the snoop cache associated with the snoop source i. If the snoop request address tag is the same as one of the address tags stored in the snoop cache, the address tag field has hit in the snoop cache. After this, the valid line vector of the snoop cache entry for which a hit was detected is compared to the valid line vector of the snoop request. If the bit of the valid line vector in the snoop cache line corresponding to the bit set in the valid line vector of the snoop request is set, the valid line vector has hit as well. In one preferred embodiment, the valid line vector check is implemented by performing a logical operation upon the bit operands. Thus, for example, the valid line vector check may be performed by AND-ing the valid line vector of the snoop request with the valid line vector of the snoop cache line, and checking if the result is zero. It is understood that other implementations may additionally be used without departing from the scope of this invention. It is further understood that checking for a valid line vector hit can be implemented in parallel with checking for an address tag hit.

At step 606, a determination is made as to whether both the "tag' field matches and the corresponding bit in the valid line vector is set. If both the "tag' field matches and the corresponding bit in the valid line vector is set, the snoop request is guaranteed not to be in the cache as indicated at step 606. Thus, this snoop request is not forwarded to the cache; it is filtered out as indicated at step 608.

Otherwise, if the address "tag" field hits in the snoop cache but the bit in the valid line vector is not set or, alternately, if the tag does not hit in the snoop cache, this indicates that the line may be in the cache. Consequently, the snoop request is forwarded to the cache by placing it into a snoop queue as indicated at step 612. This snoop request is also added as a new entry to the snoop cache as shown at step 610.

Figure 11:
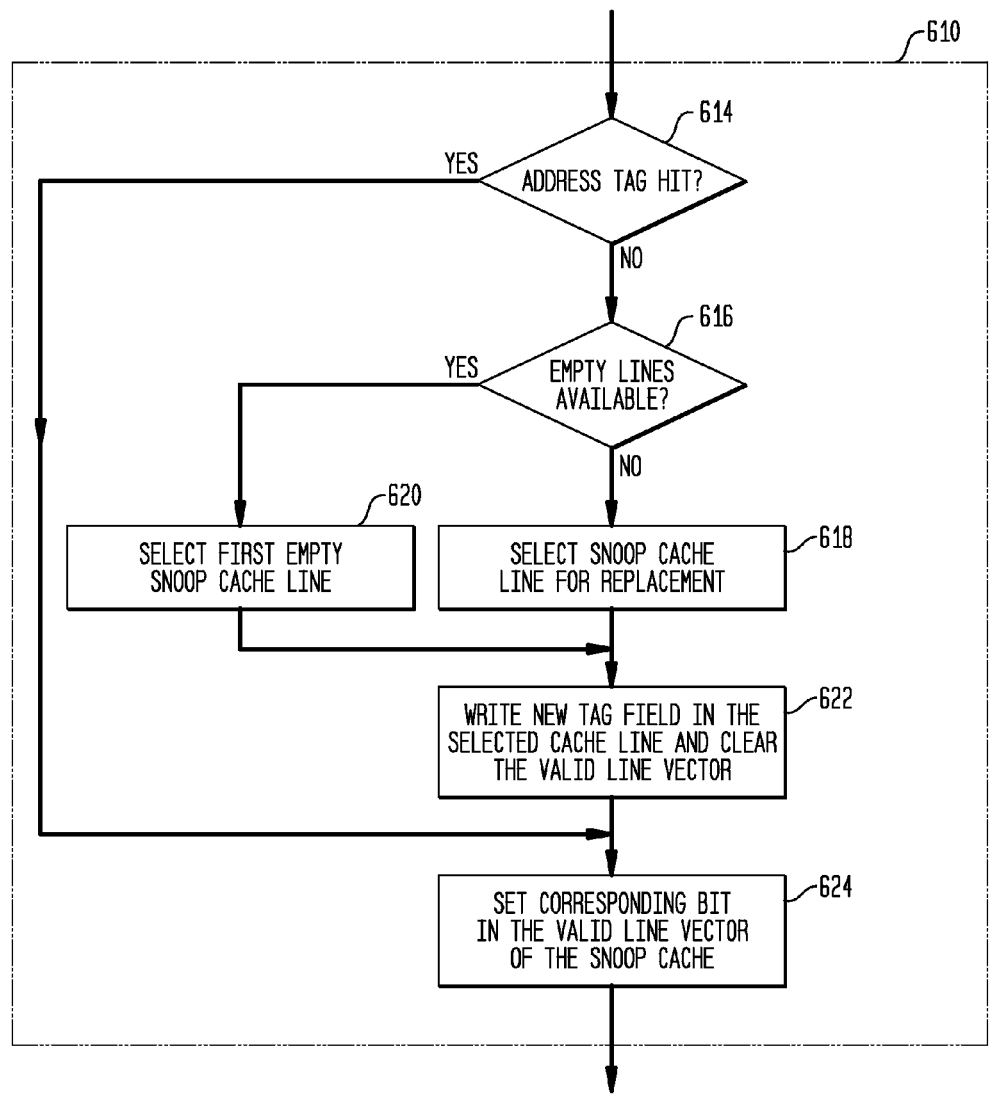
FIG. 11 depicts a control flow logic for adding a new entry to the port snoop cache in accordance with the present invention.

Referring now to FIG. 11, there is shown the details of step 610 (FIG. 10) describing the process of adding new information in the snoop cache. This is accomplished by several tasks, as will now be described. At step 614, a determination is first made as to whether the address tag is already stored in the snoop cache (i.e., the address tag was a hit). For this step, the information calculated in step 602 (FIG. 10) can be used. If the address tag check gave a hit, then the process proceeds to step 624, where the bit in the valid line vector of the selected snoop cache entry corresponding to the snoop request is set. If the address tag check gave a miss in step 614, a new snoop cache entry has to be assigned for the new address tag, and the process proceeds to 616 where a determination is made as to whether there are empty entries available in the snoop cache. If it is determined that empty entries are available, then the first available empty entry is selected as indicated at step 620. Otherwise, if it is determined that there are no empty entries in the snoop cache, one of the active entries in the snoop cache is selected for the replacement as indicated at step 618. The replacement policy can be round-robin, least-recently used, random, or any other replacement policy known to skilled artisans without departing from the scope of this invention. Continuing to step 622, the new address tag is then written in the selected snoop cache line and the corresponding valid line vector is cleared. Then, as indicated at step 624, the bit in the valid line vector of the selected snoop cache entry corresponding to the bit set in the valid line vector of the snoop request is set.

In yet another embodiment, the new information is not added into the snoop cache based on the hit or miss of a snoop request in the snoop cache only, but instead, the addition of new values—being whole snoop cache lines or only setting a single bit in a valid line vector—is based on the decision of the decision logic block 450 (FIG. 7). In this embodiment, the new information is added into the snoop cache only if the decision logic block does not filter out the snoop request. If any other filter in the snoop port filter block 400 (FIG. 7) filters out the snoop request (i.e., determines that the data are not in the local L1 cache), no new information is added to the snoop cache, but the operation steps are the same as for snoop cache hit case. The advantage of this embodiment is that the snoop cache performs better because less redundant information is stored.

Figure 12:
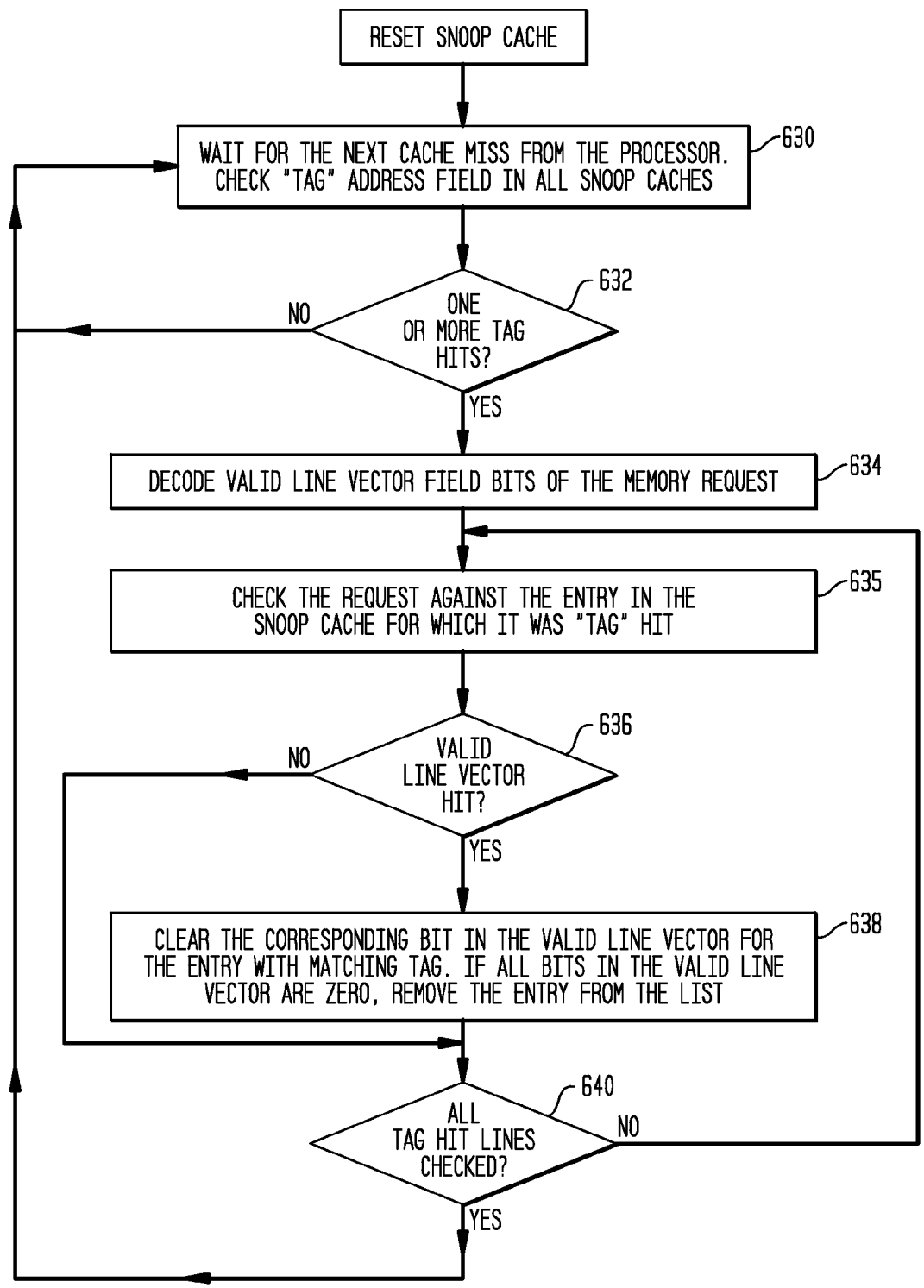
FIG. 12 depicts a control flow logic for removing an entry from the snoop cache in accordance with the present invention.

Referring now to FIG. 12, there is depicted the control flow for removing an entry from a snoop cache. On each local processor memory read request which misses in the local L1 level cache, the address of the memory request is checked against all entries in all snoop caches associated with all snoop request sources. In step 630, the address of the memory read request is parsed into an address tag field and into bits used for encoding the valid line vector. This is performed in the step 630. In the step 632, a determination is made as to whether there are one or more tag hits. This is accomplished by checking the "tag" field of the memory request against all tag fields in all snoop caches associated with all snoop sources. If the tag check misses, this address is not being filtered out and nothing has to be done. Thus, the control flow loops back to step 630 to wait for the next cache miss from the processor.

Returning to step 632, if it is determined that the comparison of the address tag with all snoop caches results in one or more hits, the information has to be removed from all snoop caches for which it was hit. Thus, at step 634, the appropriate low order bits of the memory read address are decoded into a valid line vector, and is matched against the valid line vector of the snoop cache entry that was hit as indicated in step 635. Proceeding now to step 636, it is determined whether the unique bit set in the read address vector is also set in the valid line vector of the snoop cache. If there is no such valid line vector hit (regardless of the address tag field hit), this memory address is not filtered out and nothing has to be changed in the particular snoop cache. Thus, the control flow proceeds to step 640 to check if all address tag hits have been processed, and if not, the process returns to step 635.

If, however, it is determined at step 636 that the read address vector hits in the valid line vector, then the read address is being filtered out. The corresponding valid line vector bit has to be cleared since the memory read address is going to be loaded into the first level cache. This clearing of the corresponding bit in the valid line vector is performed at step 638. If after removing the corresponding bit from the valid line vector the number of bits set of the valid line vector becomes zero, the address tag field is further removed from the snoop cache causing the entry to be empty. As next indicated at step 640, the same process of checking for the valid line vector bit, its clearing, and clearing of the address tag—if necessary—is repeated for all snoop caches which hit the memory read request which was miss in the local L1 cache. This condition that all hit address tag lines have been processed is checked at step 640. Once all of the cache lines have been checked, the process returns to step 630.

In yet another embodiment, the local memory request is compared to all address tags in all snoop caches simultaneously. Concurrently, the valid line vector encoding of the local memory request may be compared with all valid line vectors in all snoop caches in which there were hits simultaneously. Then, these two results—address tag hit and valid line vector hit—can be combined to determine all snoop cache lines from which the corresponding valid line vector bit has to be removed, and all these bits can be removed from the hitting cache lines from all snoop caches simultaneously.

Figure 13:
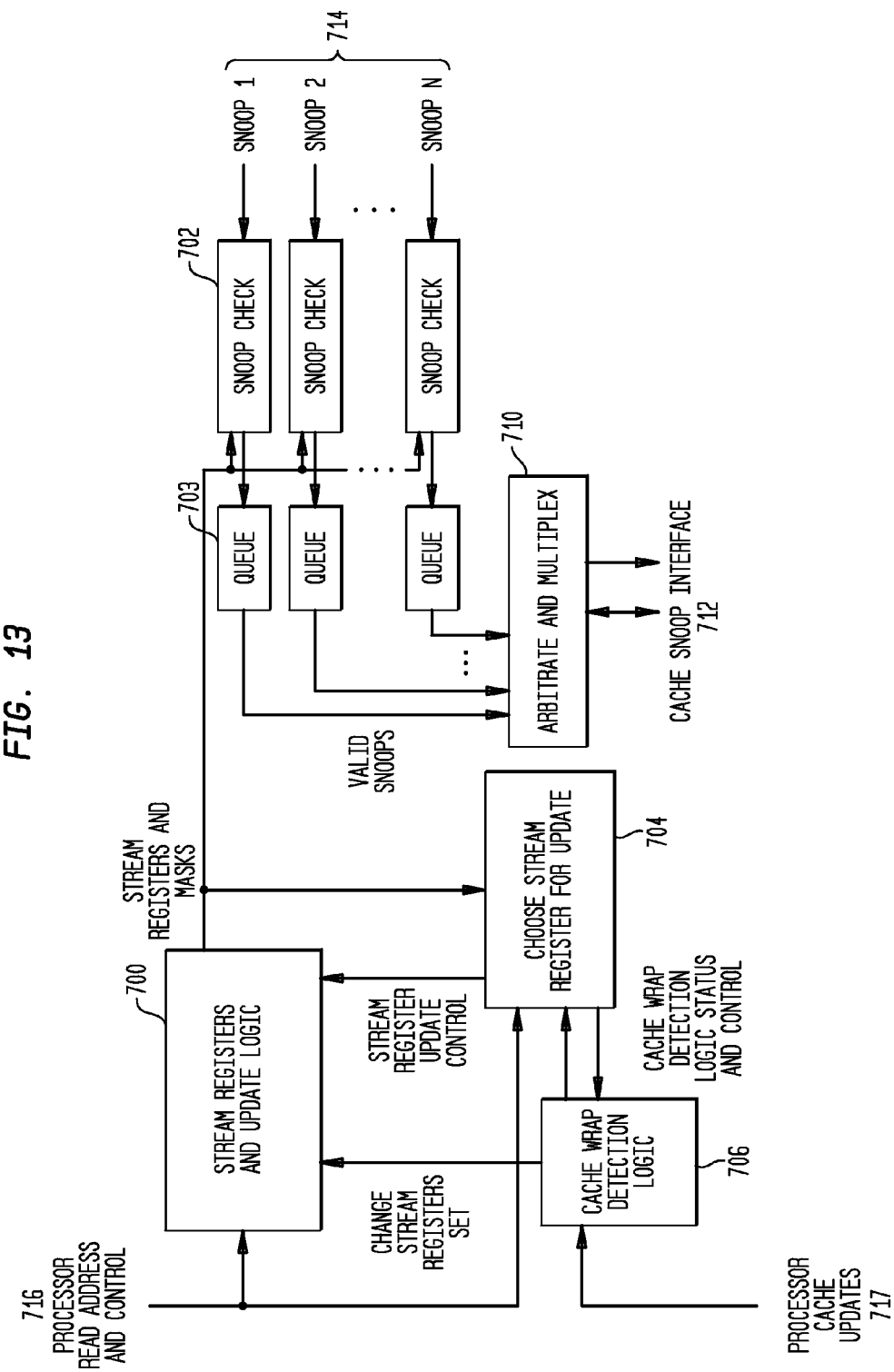
FIG. 13 depicts a block diagram of the snoop filter implementing stream registers in accordance with the present invention.

Referring now to FIG. 13, there is depicted the block diagram of the snoop filter device implementing stream registers. In one preferred embodiment, the snoop filter unit comprises the following elements: two sets of stream registers and masks 700, a snoop check logic block 702, a cache wrap detection logic block 706, a stream register selection logic block 704, filter queues 703, and a processor arbitrate and multiplex logic 710. As will be described in greater detail herein, unlike the snoop cache filters that keep track of what is not in the cache, the stream registers and masks sets 700 keep track of recent data which were loaded into the cache of the processor. More precisely, the stream registers keep track of at least the lines that are in the cache, but may assume that some lines are cached which are not actually in the cache. However, forwarding some unnecessary snoop requests to the cache does not affect correctness.

The heart of the stream register filter is the stream registers 700 themselves. One of these registers is updated every time the cache loads a new line, which is presented to the stream registers with appropriate control signals 716. Logic block 704 in FIG. 13 is responsible for choosing a particular register to update based upon the current stream register state and the address of the new line being loaded into the cache in signals 716.

Figure 14:
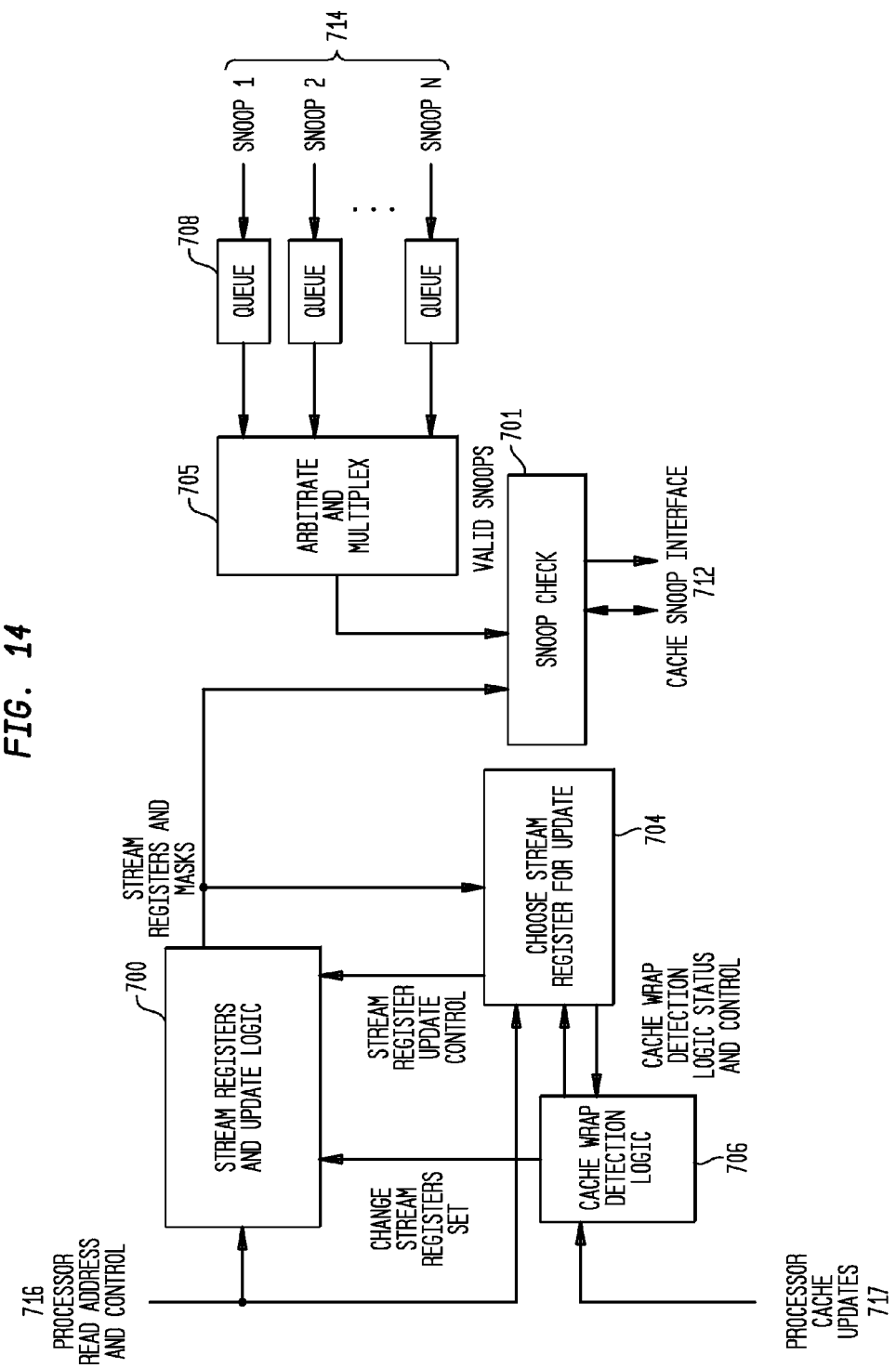
FIG. 14 depicts another embodiment of the snoop filter implementing stream registers filtering approach in accordance with the present invention.

In operation, snoop requests received from one of the N remote processors arrive as signals 714 shown in the right-hand side of FIG. 14. The snoop check logic 702 comprises a set of port filters that compare the addresses of the arriving snoop requests 714 with the state of the stream registers 700 to determine if the snoop requests could possibly be in the cache. If so, the requests are forwarded to queues 703 where they wait to be forwarded to the cache as actual cache snoops. The queuing structure of FIG. 13, where each of the N remote processors has a dedicated snoop request queue 703, is designed to allow for the maximum snoop request rate since a large number of the snoop requests will be filtered out and will never need to be enqueued. Alternative queuing structures are possible without departing from the general scope of the invention.

The arbitrate and multiplex logic block 710 simply shares the snoop interface of the cache between the N snoop request queues 703 in a fair manner, guaranteeing forward progress for all requests.

A description of how a single stream register is updated is now provided. A stream register actually comprises a pair of registers, the "base" and the "mask", and a valid bit. The base register keeps track of address bits that are common to all of the cache lines represented by the stream register, while the corresponding mask register keeps track of which bits these are. The valid bit simply indicates that the stream register is in use and should be consulted by the snoop check logic 702 when deciding whether to filter a remote snoop request 714. In order to understand the examples in the following description, consider an address space of $2^{32}$ bytes with a cache line size of 32 bytes. In this case, a cache line load address is 27 bits in length, and the base and mask registers of the stream registers are also 27 bits in length.

Initially, the valid bit is set to zero, indicating that the stream register is not in use, and the contents of the base and mask register is irrelevant. When the first cache line load address is added to this stream register, the valid bit is set to one, the base register is set to the line address, and all the bits of the mask register are set to one, indicating that all of the bits in the base register are significant. That is, an address that matches the address stored in the base register exactly is considered to be in the cache, while an address differing in any bit or bits is not. For example, given a first cache line load address is 0x1708fb1 (the 0x prefix indicates hexadecimal). Then the contents of the stream register after the load is:

Base=0x1708fb1 Mask=0x7ffffff Valid=1

Subsequently, when a second cache line load address is added to this stream register, the second address is compared to the base register to determine which bits are different. The mask register is then updated so that the differing bit positions become zeros in the mask. These zeros thus indicate that the corresponding bits of the base register are "don't care", or can be assumed to take any value (zero or one). Therefore, these bits are no longer significant for comparisons to the stream register. For example, say the second cache line load address is 0x1708fb2. Then the contents of the stream register after this second load is:

Base=0x1708fb1 Mask=0x7ffffc Valid=1

In other words, the second address and the base register differed in the two least significant bits, causing those bits to be cleared in the mask register. At this point, the stream register indicates that the addresses 0x1708fb0, 0x1708fb1, 0x1708fb2, and 0x1708fb3 can all be in the cache because it can no longer distinguish the two least significant bits. However, it is important to note that the two addresses which have actually been loaded are considered to be in the cache. This mechanism thus guarantees that all addresses presented to the stream register will be included within it. In the limit, the mask register becomes all zeros and every possible address is included in the register and considered to be in the cache. Clearly, the mechanism described can be used to continue adding addresses to the stream register.

Every cache line load address is added to exactly one of the multiple stream registers. Therefore, the collection of stream registers represents the complete cache state. The decision of which register to update is made by the update choice logic block 704 in FIG. 13. One possible selection criteria is to choose the stream register with minimal Hamming distance from the line load address (i.e. the stream register which will result in the minimum number of mask register bits changing to zero). Yet another selection criteria is to choose the stream register where the most upper bits of the base register match those of the line load address. Other selection criteria are possible and can be implemented without departing from the scope of the invention.

In selecting a stream address register to update, the line load address is compared to all base registers combined with their corresponding mask registers in parallel. The line load address is then added to the selected stream register as described herein.

The snoop check logic block 702 determines whether a snoop address 714 could possibly be in the cache by comparing it to all of the stream registers as follows: the snoop address 714 is converted to a line address by removing the low-order bits corresponding to the offset within a cache line. This line address is compared with a single stream register by performing a bitwise logical exclusive-OR between the base register and the snoop line address, followed by a bitwise logical AND of that result and the mask register. If the final result of these two logical operations has any bits that are not zero, then the snoop address is a "miss" in the stream register and is known not to be in the cache, as far as that stream register is concerned. The same comparison is performed on all of the stream registers in parallel, and if the snoop line address misses in all of the stream registers, then the snoop address is known not to be in the cache and can be filtered out (i.e. not forwarded to the cache). Conversely, if the snoop address hits in any one of the stream registers, then it must be forwarded to the cache.

The snoop check logic 702 is duplicated for each of the N remote snoop request ports, but they all share the same set of stream registers 700.

Over time, as cache line load addresses are added to the stream registers, they become less and less accurate in terms of their knowledge of what is actually in the cache. As illustrated in the example above, every mask bit that becomes zero increases the number of cache lines that the corresponding stream registers specifies as being in the cache by a factor of two. In general, the problem of forwarding useless snoop requests to the processor (i.e., failing to filter them) becomes worse as the number of mask bits that are zero increases. Therefore, the stream register snoop filter are provided with a mechanism for recycling the registers back to the initial condition. This mechanism is based upon the observation that, in general, lines loaded into the cache replace lines that are already there. Whenever a line is replaced, it can be removed from the stream registers, since they only track which lines are in the cache. Rather than remove individual lines, the stream register snoop filter effectively batches the removals and clears the registers whenever the cache has been completely replaced. However, the new cache lines that were doing this replacement were also added into the stream registers, so the contents of those registers cannot simply be discarded.

To solve this dilemma, the stream register snoop filter performs the following: starting with an initial cache state, stream register updates occur as described previously herein. The cache wrap detection logic block 706 is provided with functionality for monitoring cache update represented by cache update signals 717 and determining when all of the cache lines present in the initial state have been overwritten with new lines, i.e. the cache has "wrapped". At that point, contents of all of the stream registers (call them the "active" set) are copied to a second "history" set of stream registers and the stream registers in the active set are all returned to the invalid state to begin accumulating cache line load addresses anew. In addition, the state of the cache at the time of the wrap becomes the new initial state for the purpose of detecting the next cache wrap. The stream registers in the history set are never updated. However, they are treated the same as the active set by the snoop check logic 702 when deciding whether a snoop address could be in the cache. With this mechanism, the stream registers are periodically recycled as the cache is overwritten.

There are a number of ways that cache wrapping can be detected depending upon the cache update policy and the cache update signals 717. For example, if the cache specifies the line that is overwritten, then a simple scoreboard can be used to determine the first time that any particular line is overwritten and a counter can be used to determine when every line has been overwritten at least once. Any mechanism for detecting cache wrapping can be used without departing from the scope of the invention.

FIG. 14 shows an alternative embodiment of the stream register snoop filter, where the filter is entirely shared by the N remote processors. That is, the individual snoop request ports 714 do not have their own snoop check logic 702 as shown in the embodiment described with respect to FIG. 13. In this embodiment snoop requests are enqueued in queue structures 708 before being input to a shared snoop check logic block 701. The queued requests are forwarded in a fair manner to the snoop check logic block 701 via an arbitrate and multiplex logic 705. The functionality of the snoop check logic block 701 is otherwise identical to the previous stream register snoop filter check logic as described herein with respect to FIG. 13. Clearly, alternative queuing structures 708 are possible and do not depart from the general scope of the invention.

In a preferred embodiment, two sets of stream registers are used, but more than two sets can be used without departing from the scope of the invention. For example, in an embodiment implementing four sets of stream registers, two sets of active registers, A and B, and two sets of corresponding history registers, are implemented. In this embodiment, the A set of stream registers can contain information related to one subset of the cache, and the B set of stream registers can contain information related to a different subset of the cache. The partition of the cache into parts assigned to each set of stream registers, A and B, can be performed by dividing the cache into two equal parts, but other partitions may be used. Furthermore, the number of stream register sets can be more than two. For example, there can be one set of stream registers assigned to each cache set of a set-associative cache.

In yet another embodiment, there can be more than one history set of stream registers, allowing the active set to be recycled more frequently. However, care must be taken to manage the history registers relative to cache wrap detections so that a register is never cleared when a cache line covered by that register could still be in the cache. One way to ensure that a register is never cleared is to add history registers to the active set of stream registers and then copy all of those history registers (and the active registers) to a second set of history registers when the cache wraps. This is essentially adding a second "dimension" of history to the preferred embodiment of the stream register snoop filter as described herein.

Figure 15:
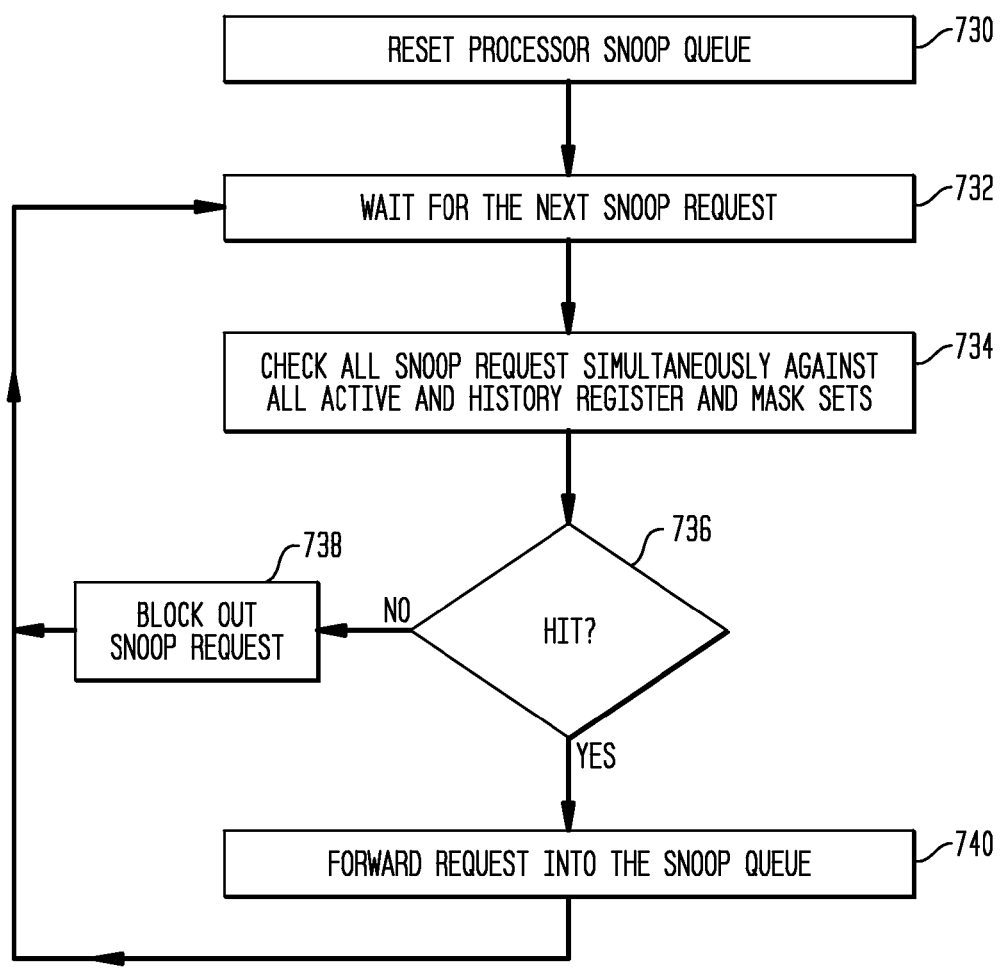
FIG. 15 is a block diagram depicting the control flow for the snoop filter using paired stream registers and masks sets according to the invention; and, FIG. 16 is a block diagram depicting the control flow for updating two stream register sets and the cache wrap detection logic for the replaced cache lines according to the invention.

Referring now to FIG. 15, there is depicted a detailed process flow diagram of the control flow for the snoop filter using paired base register and mask register sets. At the start of operation, all stream registers and masks and snoop queues are reset as indicated at step 730, and the system waits for the next snoop request from any snoop source as indicated at step 732. When a new snoop request is received, the address of the snoop request is checked against all address stream register and masks (both sets of the stream registers) as depicted in step 734. The address of the snoop requests is checked against all stream registers combined with accompanied masks (i.e., all address stream register and masks (both sets of the stream registers)). If the comparison of the current snoop request matches a stream register combined with the paired mask register as determined at step 736, the snooped cache line might be in the cache and the snoop request is forwarded to the cache by placing the snoop request into snoop queue in step 740. The process returns to step 732 to wait for the next snoop request. If, however, the snoop request does not match any stream register combined with the paired mask register in the both sets of stream registers, the snooped cache line is guaranteed not in the cache. Thus, this snoop request is filtered out in the step 738 and the process returns to step 732.

Figure 16:
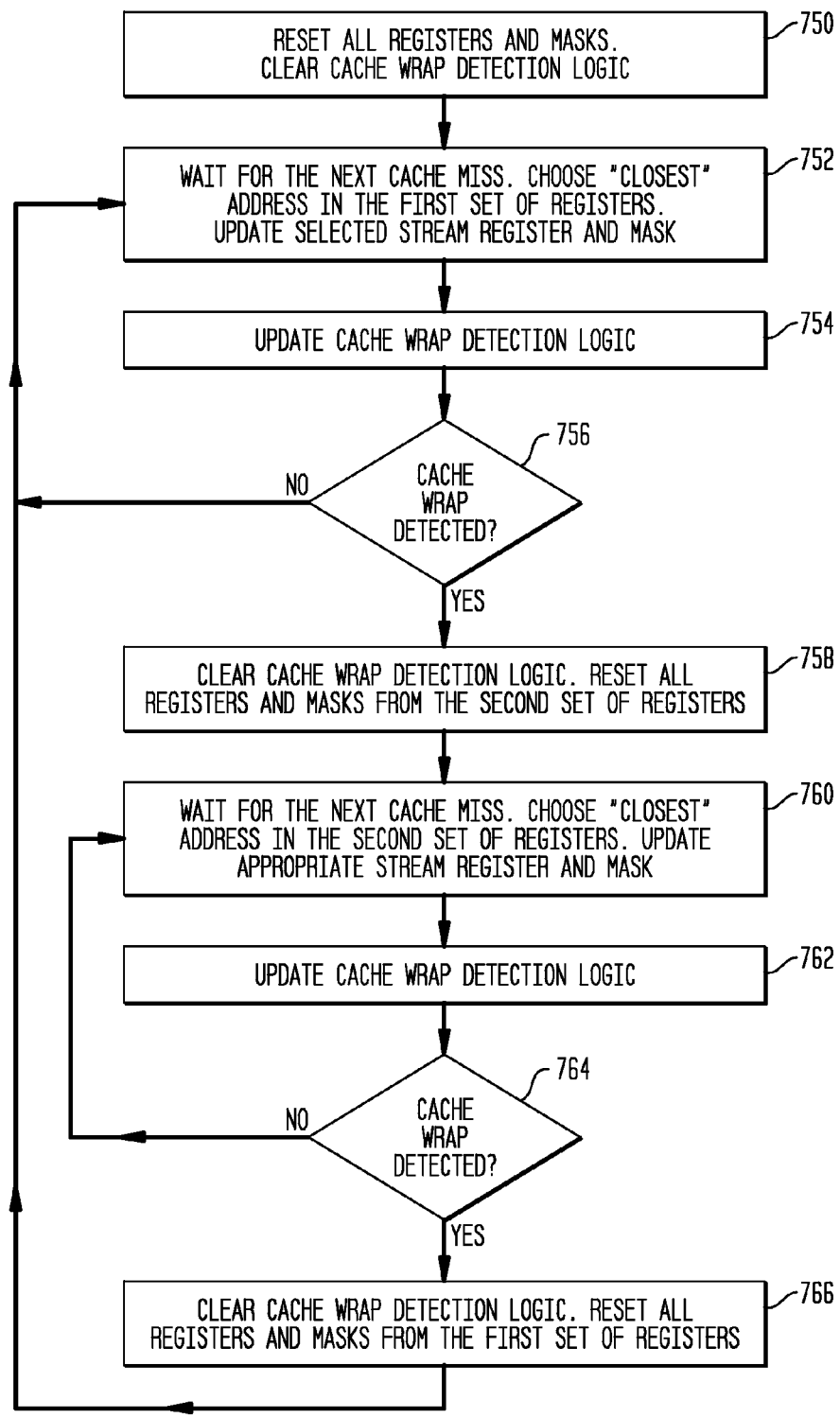

Referring now to FIG. 16, there is depicted the control flow for updating two stream register sets and the cache wrap detection logic block for the replaced cache lines. At the start of operation, all stream registers and masks are reset and the cache wrap detection logic is cleared as indicated at step 750, and first set of registers is activated. For each processor memory request (including either a load or store operation) that misses in L1 cache, the address of the memory request is added to a first set of stream registers, referred to as an active address stream register set. All address stream registers from the first set of registers are checked to select the best match— as specified by the implemented register selection criteria; alternately, the first empty stream register may be selected. The address of the memory request is stored into the selected stream address register in the active register set as indicated at step 752, and the paired mask is updated to reflect which bits of the address are relevant, and which are not. Then, at step 754, the cache wrap detection logic is updated to reflect the new data loaded in the cache. The cache wrap detection block keeps track of whether all lines in the cache have been replaced since first use of the active registers was initiated. Thus, at step 756, a determination is made as to whether a cache wrap condition exists. If a cache wrap condition is not detected in step 756, the control flow loops back to the step 752 where the system waits for the next processor memory request. Otherwise, if a cache wrap condition is detected, the control continues to the step 758 where the cache wrap detection logic block is cleared and a second stream registers and masks set are cleared in the step 758. Proceeding next to step 760, the system waits for the next processor memory request. For the new memory request, all address stream registers from the second set of registers are checked to select the best match, e.g., as specified by the implemented register selection criteria, for example, or, the first empty stream register is selected. The address of the memory request is stored into the selected stream address register in the second register set as indicated at step 760, and the paired mask is updated to reflect which bits of the address are relevant. Proceeding to step 762, the cache wrap detection logic is updated to reflect the new data loaded in the cache. As the cache wrap detection logic keeps track of all lines in the cache that have been replaced since first use of the second set of registers was initiated, a determination is then made at step 764 to determine if a cache wrap condition exists. If no cache wrap event is detected in the step 764, the system waits for the next processor memory request by returning to step 760. If, however, the cache wrap event is detected, the first set of registers and masks will be used again. Thus, all registers and paired masks from the first set of registers are reset, the cache wrap detection logic is cleared in the step 766. The first set of registers are going to be used again as active for approximating the content of the cache, and the control flow is looped back to the step 752.

As described herein with respect to use of the stream register snoop filter, the power of each stream register filter to block snoop requests decreases as the number of mask bits set to zero increases. For example, if all mask bits are zero, then all snoop requests must be sent through. However, supposing these mask bits were set to zero one bit at a time (i.e., each load differs from the stream register by only one bit), then, in such a case, a snoop request for an address having exactly two bits different from the stream register would be let through, even though this address cannot be in the cache. Accordingly, additional filtering capability is provided by implementing signature filters that enable detection of more complicated, or subtle, differences such as the number of different bits. The general idea is that a snoop is forwarded from a stream register only if both the mask filter and the signature filter indicate that the address might be in the cache.

Figure 17:
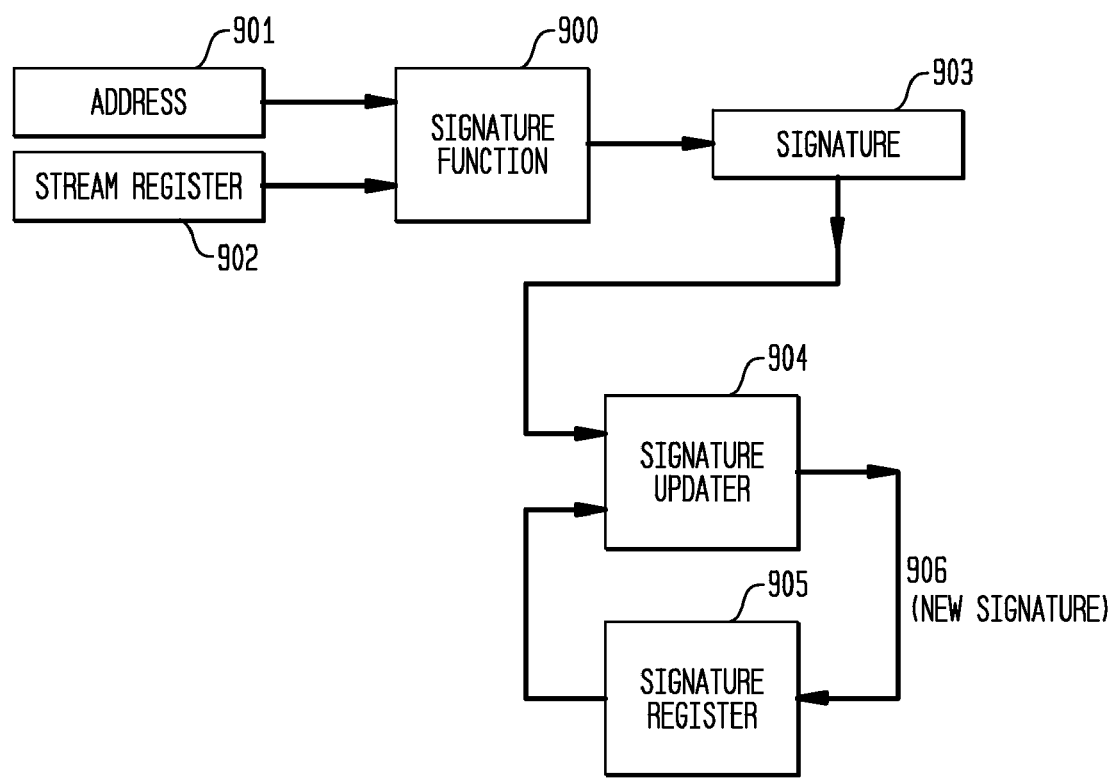
FIG. 17 illustrates block diagram of signature filters to provide additional filtering capability to stream registers.

Referring to FIG. 17, there is a signature function 900 that takes as inputs, an address 901 and a stream register 902 and computes the signature 903 of the address, relative to the stream register. There are many possible signature functions, such as:

1. The number of bits in the address that are different than the stream register address. Denote this number by $s$. Truncation can be used to save space, e.g., set the signature to $\min(M,s)$ for some constant M.
2. If the address is N bits long, the signature is a vector of length $B=(N+1)$ bits with zeros in every bit except for a one in bit $i$ if $s=i$. To save space, this could be truncated to a vector of length $B+1$ ($B+1<N$) where there is a one in bit $i$ if $\min(s,B)=i$.
3. Divide the address into k (k>1) groups of bits. The length of group $i$ is $L(i)$ bits and let $M(i)=L(i)+1$. Let $s(i)$ be the number of address bits in group $i$ that are different than the stream register bits in group $i$. Then the signature is given by $(s(1), s(2) \ldots, s(k))$, which is simply the number of different bits in each group. These groups may consist of either disjoint sets of bits, or partially overlapping sets of bits (i.e., some bit of an address is in more than one group). The length of the signature is $B(1)+ \ldots +B(k)$ bits where $B(i)$ is the number of bits required to represent all possible values of $s(i)$.
4. A combination of (2) and (3) above, in which the signature consists of k bit vectors corresponding to each of the groups. Bit $i$ in group $j$ is set to one if $s(j)=i$. If group $i$ is of length $L(i)$ bits then it requires $M(i)=(L(i)+1)$ bits to encode all possible values of $s(i)$. The signature is $M(1)+ \ldots +M(k)$ bits long. Truncation can be used to save space, e.g., bit $i$ in group $j$ is set to one if $\min(M,s(j))=i$ for some constant M.
5. As in (3) above, but there are $M(1)* \ldots *M(k)$ different unique combinations of $s(1), \ldots, s(k)$. Assign an integer $q$ to each combination, and set the signature to a vector of all zeros except for a one in bit $q$. Truncation, as in (4) above, can reduce space.
6. Divide the address into k (k>1) groups of bits and let p(i) be the parity of the address bits in group $i$. Then the signature is given by $(p(1), p(2) \ldots, p(k))$.
7. As in (6) above, but encode each of the $2^k$ combinations of parity to an integer $q$, and return a bit vector of length $2^k$ zeros, except for a one in bit $q$. It is understood that many other signatures are possible.

If the address 901 is a load to the cache, the signature 903 is fed to a signature register updater 904. The updater also takes the previous value of a signature register 905 as input and replaces it by a new value 906. The appropriate way to update the signature register depends on the type of signature. Let S_old denote the old value of the signature register, S_new denote the new value of the signature register, and V denote the value of the signature 903. Corresponding to the signature functions above, the signature updater 904 computes:

1. S_new=max(S_old, V). This keeps track of the maximum number of bits that differ from the stream register.
2. S_new=S_old bit-wise-or V. This keeps a scoreboard of the number of different bits.
3. S_new=max(S_old, V). This keeps track of the maximum number of bits in each group that differ from the stream register.
4. S_new=S_old bit-wise-or V. This keeps a scoreboard of the number of different bits in each group.
5. S_new=S_old bit-wise-or V. This keeps a scoreboard of the number of different bits in each group that occur simultaneously.
6. S_new=S_old bit-wise-or V. This keeps a scoreboard of the parity in each group.
7. S_new=S_old bit-wise-or V. This keeps a scoreboard of the parity in each group that occur simultaneously.

When a snoop request comes in, its signature is computed and compared to the signature register. It a match does not occur there, the address cannot be in the cache, so the request is filtered even if the normal stream register and mask filter indicates that it might be in the cache. A snoop is forwarded only if the signature register and mask register both indicate that the address might be in the cache.

Figure 18:
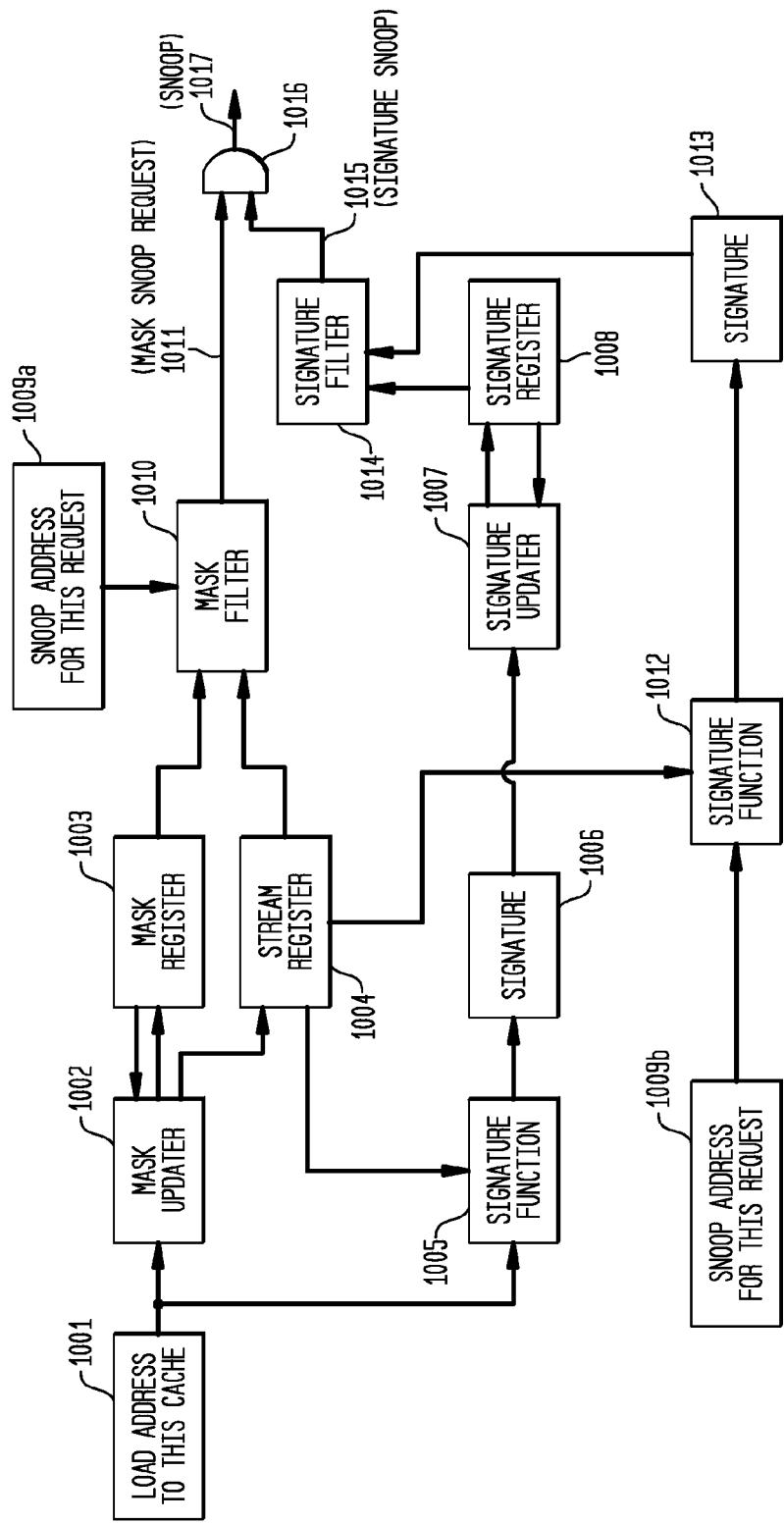
FIG. 18 is the block diagram of filtering mechanism using signature files in accordance with the present invention.

The signature filtering mechanism is shown in FIG. 18. A load address 1001 to the cache is sent to the mask update logic 1002 which operates as described earlier, taking the previous mask register 1003, a stream register 1004 and updating the mask register 1003. This address 1001 is also fed to a signature function 1005 that also takes the stream register 1004 as input and produces a signature 1006. The signature 1006 and previous signature register 1008 are fed to the signature update logic 1007 that creates a new value for the signature register 1008.

When a snoop address 1009*a* request comes in, it is received and processed by the mask filter 1010 producing a mask snoop request 1011. In addition, this same snoop address (shown as 1009*b*) and the stream register 1004 are fed to the signature function 1012 producing a signature 1013. Note that the signature functions 1005 and 1012 must be identical logic, meaning that if they have the same inputs they will produce the same outputs. The signature of the snoop request 1013 and the signature register are fed to the signature filter 1014.

This filter must determine if a request having this signature might be in the cache and its exact operation depends on the type of signature. In the case of the "scoreboard" types of signature updaters, the snoop signature is bit-wise and-ed with the signature register, If the result of this is non-zero, then a signature snoop request 1015 is made (i.e., that signal is set to 1 if a request is to be made and 0 otherwise). In the case of "maximum number of bits changed" types of signature updaters, a check is made to see if the snoop signature is less than or equal to the signature register (one comparison for each group). If all such comparisons are true, the address might be in the cache and the signature snoop request 1015 is made. The mask snoop request 1011 and the signature snoop request 1015 are AND-ed together in logic element 1016 to generate a snoop request signal 1017. If this signal is 1, a snoop request will be generated unless it is ruled out by the snoop vector lists, or an applied range filter (see FIG. 7). However, specifically, such a snoop request cannot be ruled out by the result of a signature-mask filter from another stream register.

The signature register is set appropriately at the same time that the stream register is first set, or reset. For scoreboard types and max-types of signatures, the signature register is set to all zeros (indicating no bits different from the stream register).

The stream register filter relies upon knowing when the entire contents of a cache have been replaced, relative to a particular starting state—a cache wrap condition as referred to herein. A set-associative cache is considered to have wrapped when all of the sets within the cache have been replaced. Normally, some sets will be replaced earlier than others and will continue to be updated before all sets have been replaced and the cache has wrapped. Therefore, the starting point for cache wrap detection is the state of the cache sets at the time of the previous cache wrap.

In one embodiment, the cache is set-associative and uses a round-robin replacement algorithm, however other replacement implementations are possible. For instance, cache wrap detection may be achieved when the cache implements an arbitrary replacement policy, including least-recently-used and random. As referred to in the description to follow, a set-associative (SA) cache comprises some number of sets, where each set can store multiple lines (each with the same set index). The lines within a set are called "ways". Hence, a 2-way set associative cache has two (2) lines per set. All of the ways within a set are searched simultaneously during a look-up, and only one of them is replaced during an update. Furthermore, a set can be partitioned such that a subset of the ways is assigned to each partition. For example, a 4-way SA cache may be partitioned into two 2-way SA caches. The virtual memory page table (and the translation lookaside buffer (TLB)) can provide a partition identifier that specifies which cache partition a particular memory reference is targeted at (both for look-up and update). The register that stores the way to be updated for a cache wrap needs to be big enough to store a way number. For example, 2 bits for a 4-way SA cache, or 5 bits for a 32-way SA cache. There is one such register per set because each set can wrap at a different time.

In one embodiment of the invention, the cache is partitionable into three partitions, with each partition including a contiguous subset of the cache ways, and that subset is the same within each cache set. Memory references are designated by the processor's memory management unit to be cached in one of the three partitions. Updates to a partition occur independently of the other partitions, so one partition can wrap long before the entire cache wraps. However, detecting the wrapping of a partition is identical to detecting the wrapping of the entire cache when the partition being updated is known. Thus, as referred to hereinafter, cache wrapping includes either partition wrapping or entire cache wrapping.

In order for external logic to detect cache updates, a cache must provide an indication that an update is occurring and which line is being overwritten. The logic of the preferred embodiment assumes that this information is provided by means of a set specification, a way specification and an update indicator.

Figure 19A:
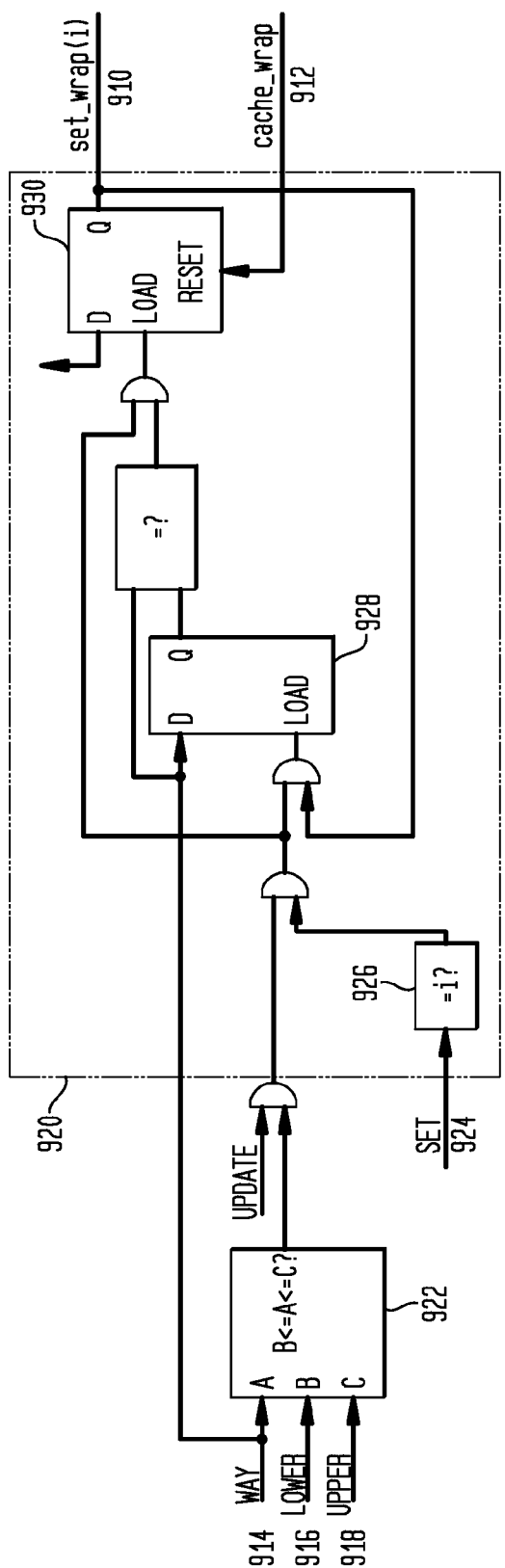
FIGS. 19(a) and 19(b) depict exemplary cache wrap detection logic circuitry (registers and comparator) for an N-way set-associative cache.
Figure 19B:
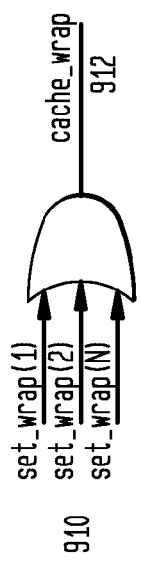

FIGS. 19(*a*) and 19*b*) depict the cache wrap detection logic of the preferred embodiment for an N-way set-associative cache. In this embodiment, it is assumed that updates to a set are always performed in round-robin order. That is, the "victim" way chosen to be overwritten is always the one following the previously-overwritten one.

FIG. 19(*a*) particularly depicts one embodiment of logic implemented for detecting the wrap of a single partition of a single set (set "i" in the embodiment depicted) within the logic block 920. When this logic has detected a wrap in set i, it asserts the set_wrap(i) signal 910. FIG. 19(*b*) shows how the individual set_wrap(i) 910 signals from all N sets of the cache are combined with a logic OR function to produce the cache_wrap 912 signal, which asserts when the entire cache (i.e. all sets) have wrapped. It is understood that the logic and circuitry depicted in FIGS. 19(*a*) and 19(*b*) is only one example implementation and skilled artisans will recognize that many variations and modifications may be made thereof without departing from the scope of the invention.

On the left-hand side of FIG. 19(*a*), there is depicted a partition detection logic block 922 that determines when a cache update falls within the partition that is being monitored for wrapping. This logic assumes that the partition extends from a way specified by "lower" 916 to the way specified by "upper" 918. Therefore, the remainder of the logic that detects set wraps partition only changes state when there is an update, and that update falls within the partition of interest. Note that the partition detection logic 922 is common to all N copies of the set wrap detection logic.

Within the set wrap detection logic, the common partition update indicator is further qualified to act only when the update is to the particular set i associated with that logic. This is done by matching the set specifier 924 to the index of the set wrap detection logic 926.

The remainder of the logic circuits function as follows: Assume that initially, the flip-flop driving set_wrap(i) 930 is clear, indicating that the set has not wrapped, and the register 928 includes the way that must be updated to complete a set wrap. In this state, the register retains its value. When a cache update occurs, where the way 914 matches the contents of the register 928, as determined by a comparator device 919, the flip-flop driving set_wrap(i) 930 is loaded with logic 1, causing set_wrap(i) 910 to assert. Thereafter, cache updates cause the updated way 914 to be stored in the register 928, so the register 928 effectively tracks those updates. When all cache sets have wrapped, the combined cache_wrap 912 signal is asserted as shown in FIG. 19(*b*), causing the flip-flop 930 to clear (assuming Reset takes precedence over Load). This returns the circuit to the initial state, with the register 928 storing the way that must be updated to indicate the next set wrap.

It is thus understood that there is one register per set that stores the number of a way and when that way is overwritten, then the set has wrapped. However, the sets wrap at different times (depending on the access pattern), and the entire cache is not considered to have wrapped until all sets have wrapped. At that point, the state of the victim way pointers (i.e. pointer to the last way that was overwritten; one per set) becomes the new initial condition for detecting the next cache wrap. The first embodiment accommodates this requirement by having the register described above keep track of ways that are overwritten between the time that it has wrapped and the time that the entire cache has wrapped. Then when the whole cache wraps, it stops tracking the overwritten ways and becomes the basis for comparison for determining when the set wraps again.

In a second embodiment of the cache wrap detection logic, a counter is implemented, so when the whole cache wraps, all set counters are reset to the number of ways in the partition. As ways are overwritten, the counters count down; and when a counter reaches zero, then the corresponding set has wrapped. When all counters reach zero, then the cache has wrapped and the process starts again.

Figure 20:
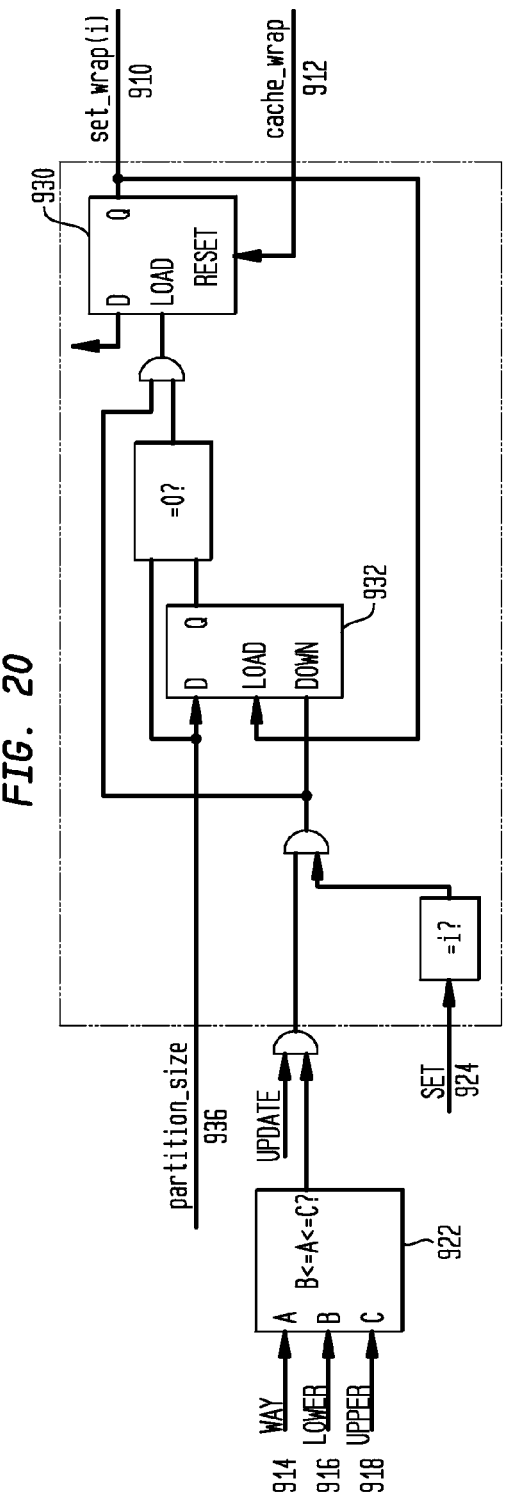
FIG. 20 depicts an exemplary cache wrap detection logic circuitry for an N-way set-associative cache according to a second embodiment of the invention that is based on a loadable counter; and, FIG. 21 depicts an exemplary cache wrap detection logic circuitry for an N-way set-associative cache according to a third embodiment of the invention that is based on a scoreboard register.

According to this second embodiment, the set wrapped detection logic provided within the box 920 depicted in FIG. 19(*a*) is thus based on a loadable counter, rather than a register and comparator. This logic is shown in FIG. 20. In this logic, a down-counter device 932 is loaded with the number of ways in the partition 936 while set_wrap(i) 910 is asserted (assuming Load takes precedence over Down). When all sets have wrapped and cache_wrap 912 is asserted, the flip-flop 930 driving set_wrap(i) is cleared and the counter 932 is no longer loaded. Thereafter, each update to the partition 914 and set 934 tracked by the logic cause the counter 932 to count down by one. Once it reaches zero, the flip-flop 930 is loaded with logic 1, causing set_wrap(i) 910 to be asserted, and returning the logic to the initial state.

Figure 21:
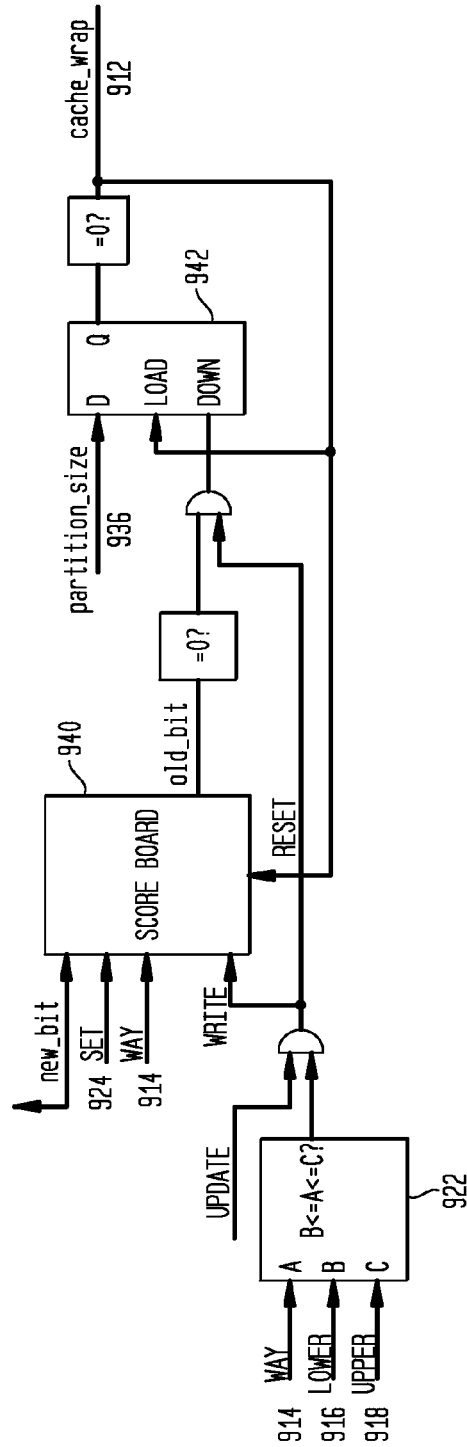

A third embodiment of the cache wrap detection logic, shown in FIG. 21, will work with a cache that implements any replacement policy, including least recently used and random. In this case, a scoreboard 940 is used to keep track of the precise cache way 914 that is overwritten. Specifically, it is used to detect the first write to any way. In addition, a counter 942 keeps track of the number of times that a scoreboard bit was first set (i.e. goes from 0 to 1). It does this by only counting scoreboard writes where the overwritten bit (old_bit) is zero. The counter 942 is pre-loaded to the partition size 936 (i.e. number of ways in the partition), so once this counter reaches zero, the entire cache partition has wrapped. This is indicated by the cache_wrap 912 signal being asserted, causing the counter 942 to be reloaded (assuming Load takes precedence over Down) and the scoreboard 940 to be cleared (i.e. reset).

While the preferred embodiment of the present invention is practiced in conjunction with a write-through cache, wherein snooping only occurs on write requests, and the results of a snoop action are the invalidation of a local data copy, the invention is not so limited. For instance, the invention can also be practiced in conjunction with write-back cache organizations. In accordance with a write-back cache, a coherence protocol will include additional transactions, e.g., including but not limited to, those in accordance with the well-known MESI protocol, or other coherence protocols. In accordance with a coherence protocol for writeback caches, read transaction on remote processors cause snoop actions to determine if remote caches have the most recent data copy in relation to the main memory. If this is the case, a data transfer is performed using one of several ways, including but not limited to, causing the processor having the most recent data to write the data to main memory, directly transferring the data from the owner of the most recent copy to the requester, or any other method for transferring data in accordance with a snoop intervention of a specific protocol. In accordance with this invention, a snoop filtering action can be used to determine an accelerated snoop response.

While the preferred embodiments have been described in terms of fixed interconnection topologies, and fixed snoop filtering operations, in one aspect of the present invention the snoop filtering subsystem has programmable aspects at one, or more, levels of the snoop filter hierarchy. In accordance with one embodiment of a programmable feature of the present invention, the interconnect topology is selected. In accordance with one variety of programmable topology, the one-to-one and one-to-many relationship between different filters in a topology is selectable. In accordance with another aspect of a programmable embodiment, the order in which a first snoop filter, and then a second snoop filter is accessed, or alternatively, a first or second snoop filter are accessed in parallel, is configurable under program control.

In accordance with yet another aspect of yet another embodiment of a programmable feature of the present invention, the operation of a filter subunit is programmable. This can be in the form of configurable aspects of a snoop filter, e.g., by configuring programmable aspects such as associativity of the cache being snooped, the coherence architecture being implemented, and so forth. In another aspect of a programmable filter subunit, the filter subunit is implemented in programmable microcode, whereby a programmable engine executes a sequence of instructions to implement the aspects of one or more preferred embodiments described herein. In one aspect, this is a general microcode engine. In another aspect, this is an optimized programmable microcode engine, the programmable microcode engine having specialized supporting logic to detect snoop filter-specific conditions, and, optionally, specialized operations, such as "branch on cache wrap condition", specialized notification events, e.g., in the form of microcode engine-specific exceptions being delivered to the microcode engine, such as "interrupt on cache wrap condition", and so forth.

In yet another embodiment of a programmable feature of the present invention, parts or all of the aspects of snoop filtering are implemented incorporating a programmable switch matrix, or a programmable gate array fabric. In one of these aspects, the routing between snoop subunits is performed by configuring the programmable switch matrix. In another aspect of this programmable embodiment, the actions of the snoop filter unit are implemented by configuring a programmable gate array logic block. In another aspect of the present invention, the entire snoop filter block is implemented by configuring at least one field-programmable gate array cell.

In accordance with another embodiment of a programmable feature of the present embodiments, one or more snoop filter subsystems can be disabled, certain snoop filtering steps can be bypassed, or snoop filtering can be disabled altogether. In one embodiment, this is achieved by writing the configuration of the snoop filter in a configuration register. In another embodiment, this configuration can be selected by input signals.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A system for supporting cache coherency in a multiprocessor computing environment having multiple processing units, each processing unit having one or more local cache memories associated therewith and operatively connected via a first communications means, said system comprising:

a plurality of snoop filter devices in 1:1 correspondence with an associated processing unit, each said snoop filter device having a plurality of dedicated input ports for receiving snoop requests from dedicated memory writing sources in said multiprocessor computing environment;

a point-to-point interconnect means comprising communication links for directly connecting said memory writing sources to the dedicated input ports of all other snoop filter devices associated with all other processing units of said multiprocessor computing environment;

each of said plurality of snoop filter devices further having a plurality of parallel operating port snoop filters in 1:1 correspondence with said plurality of dedicated input ports, each said plurality of parallel operating port snoop filters having a corresponding snoop cache adapted for tracking snoop requests from a corresponding one of said dedicated memory writing sources and recording an address of each snoop request from its corresponding memory writing source; and, and having a corresponding snoop cache logic means for comparing a received snoop request address against all addresses recorded in said corresponding snoop cache, said plurality of port snoop filter devices concurrently filter snoop requests received from respective said dedicated memory writing sources and forward a subset of those requests to its associated processing unit, whereby a number of snoop requests forwarded to a processing unit is reduced thereby increasing performance of said computing environment.

2. The system as claimed in claim 1, wherein a dedicated memory writing source of said snoop request comprises one of said multiple processing units.

3. The system as claimed in claim 1, wherein a dedicated memory writing source of said snoop request comprises a Direct Memory Access (DMA) engine.

4. The system as claimed in claim 1, wherein each said snoop filter device further comprises:

a plurality of processor snoop filter queue means in correspondence with said plurality of port snoop filters for receiving, enqueing, and forwarding said subset of snoop requests to the associated processing unit of said snoop filter device.

5. The system as claimed in claim 4, wherein each said snoop filter device further comprises:

means for arbitrating between all of the snoop filter queue means and serializing all snoop requests forwarded from each of said plurality of processor snoop filter queue means for forwarding to said associated processing unit.

6. The system as claimed in claim 4, further comprising means for preventing a queue overflow condition in each said processor snoop filter queue means, said means comprising:

for each snoop filter device:

a means for issuing a token to each memory writing source via its dedicated point-to-point communication link indicating availability to receive a snoop request at that port; and, means for collecting tokens at said memory writing source, wherein a snoop request corresponding to a memory write from said memory writing source is transmitted to each said snoop filter device when at least one token is available for each snoop filter device for which it is directly point-to-point connected.

7. The system as claimed in claim 1, wherein each port snoop filter of said plurality of port snoop filters comprises one or more sub-filter elements for filtering out received snoop requests.

8. The system as claimed in claim 1, wherein said one or more local cache memories associated with a processing unit comprises first and second cache memory levels, said associated snoop filter device adapted for filtering out snoop requests at said first cache memory level.

9. The system as claimed in claim 1, wherein said one or more local cache memories associated with a processing unit comprises first and second cache memory levels, said associated snoop filter device adapted for filtering out snoop requests at said second cache memory level.

* * * * *